US012036175B2

(12) United States Patent
Park et al.

(10) Patent No.: US 12,036,175 B2
(45) Date of Patent: Jul. 16, 2024

(54) VIBRATORY STIMULATION DEVICE AND VIBRATORY STIMULATION SYSTEM INCLUDING THE SAME

(71) Applicant: Electronics and Telecommunications Research Institute, Daejeon (KR)

(72) Inventors: Kang-Ho Park, Daejeon (KR); Jong Tae Lim, Daejeon (KR); Seung Youl Kang, Daejeon (KR); Bock Soon Na, Daejeon (KR); Chan Woo Park, Daejeon (KR); Seongdeok Ahn, Daejeon (KR); Wooseup Youm, Daejeon (KR); Ji-Young Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 651 days.

(21) Appl. No.: 17/328,277

(22) Filed: May 24, 2021

(65) Prior Publication Data

US 2021/0361525 A1 Nov. 25, 2021

(30) Foreign Application Priority Data

May 25, 2020 (KR) ........................ 10-2020-0062514
Apr. 27, 2021 (KR) ........................ 10-2021-0054318

(51) Int. Cl.
*A61H 23/02* (2006.01)

(52) U.S. Cl.
CPC ..... *A61H 23/0245* (2013.01); *A61H 2201/16* (2013.01); *A61H 2201/5038* (2013.01); *A61H 2205/021* (2013.01); *A61H 2205/022* (2013.01)

(58) Field of Classification Search
CPC ............ A61H 23/0245; A61H 23/0236; A61H 23/0263; A61H 2201/16; A61H 2201/5038; A61H 2201/105; A61H 2201/165; A61H 2201/5002; A61H 2205/021; A61H 2205/022; A61H 7/004
See application file for complete search history.

(56) References Cited

U.S. PATENT DOCUMENTS

| | | | |
|---|---|---|---|
| 9,744,096 | B2 | 8/2017 | Park et al. |
| 11,006,520 | B2 | 5/2021 | Ahn et al. |
| 2009/0153499 | A1 | 6/2009 | Kim et al. |

(Continued)

FOREIGN PATENT DOCUMENTS

| | | | |
|---|---|---|---|
| KR | 100775675 | B1 | 11/2007 |
| KR | 1020100089018 | A | 8/2010 |

(Continued)

*Primary Examiner* — Emily P Pham
(74) *Attorney, Agent, or Firm* — William Park & Associates Ltd.

(57) ABSTRACT

Provided is a vibratory stimulation device including a first substrate, a connection band connected to both sides of the first substrate, and a vibration element array including a plurality of vibration elements provided on the first substrate, wherein each of the vibration elements includes a stand provided on the first substrate, a vibration film provided on the stand and in contact with the stand at an edge, a vibrator provided on an upper or lower surface of the vibration film, and an electrode wire connected to the vibrator, wherein the vibration film includes a material that is more flexible and stretchable than the stand.

20 Claims, 42 Drawing Sheets

(56) References Cited

U.S. PATENT DOCUMENTS

| | | | | |
|---|---|---|---|---|
| 2010/0165794 | A1* | 7/2010 | Takahashi .............. | H04R 17/00 367/189 |
| 2014/0116148 | A1* | 5/2014 | Endo .................... | A61B 8/4483 73/661 |
| 2020/0130013 | A1 | 4/2020 | Park et al. | |

FOREIGN PATENT DOCUMENTS

| | | | |
|---|---|---|---|
| KR | 200483838 | Y1 | 6/2017 |
| KR | 20190127197 | A | 11/2019 |
| KR | 1020200050094 | A | 5/2020 |

* cited by examiner

ON

OFF

ON

OFF

VIBRATORY STIMULATION DEVICE AND VIBRATORY STIMULATION SYSTEM INCLUDING THE SAME

CROSS-REFERENCE TO RELATED APPLICATIONS

This U.S. non-provisional patent application claims priority under 35 U.S.C. § 119 of Korean Patent Application Nos. 10-2020-0062514, filed on May 25, 2020, and 10-2021-0054318, filed on Apr. 27, 2021, the entire contents of which are hereby incorporated by reference.

BACKGROUND

The present disclosure relates to a vibratory stimulation device, and more particularly, to a vibratory stimulation device including a vibration element array in which vibration interference is attenuated, and a vibratory stimulation system including the same.

In general, the vibration element may be an actuator element that generates and transmits vibration using an electric motor, a piezoelectric element, or a capacitive element. The vibration element may improve skin elasticity and blood circulation by giving vibration stimulation to human skin, and the like, remove impurities from pores, and help nutrients such as drugs and moisture to be absorbed well.

SUMMARY

The present disclosure provides a vibratory stimulation device including a vibration element array in which vibration interference is attenuated, and a vibratory stimulation system including the same.

An embodiment of the inventive concept provides a vibratory stimulation device including: a first substrate; a connection band connected to both sides of the first substrate; and a vibration element array including a plurality of vibration elements provided on the first substrate, wherein each of the vibration elements includes: a stand provided on the first substrate; a vibration film provided on the stand and in contact with the stand at an edge; a vibrator provided on an upper or lower surface of the vibration film; and an electrode wire connected to the vibrator, wherein the vibration film includes a material that is more flexible and stretchable than the stand.

In an embodiment, the vibration film may include PDMS, PMMA, elastomer, silicone, urethane, rubber, polyacrylic, elastic fiber, tape, or sponge.

In an embodiment, the stand may include plastic, curable resin, metal, ceramic, or oxide.

In an embodiment, the stand may have a cylindrical or polygonal column shape in which at least one of upper part and lower part is open.

In an embodiment, the stand or the vibration film may include air holes through which air freely enters and exits.

In an embodiment, the vibrator may be an eccentric rotating mass (ERM), a linear resonator actuator (LRA), or a piezoelectric actuator configured to generate vibration according to an applied electric signal.

In an embodiment, at least a portion of the connection band may include Velcro or a patch having adhesive force, wherein the connection band may have a clothing shape that is fixed or adhered to a body part.

In an embodiment, each of the vibration elements may further include a protruding structure provided on an upper surface of the vibrator or an upper surface of the vibration film.

In an embodiment, each of the vibration elements may further include a vibrator pocket surrounding the vibrator and adhered to an upper or lower surface of the vibration film.

In an embodiment, the vibratory stimulation device may further include a second substrate provided between the first substrate and the vibration element array, wherein the second substrate may include a material that is more flexible and stretchable than the first substrate.

In an embodiment, the vibratory stimulation device may further include a protective film provided on the vibration element array, wherein the protective film may be in contact with an upper surface of the vibrator of each of the vibration elements, wherein the protective film may include a material that is more flexible and stretchable than the first substrate.

In an embodiment, the vibratory stimulation device may further include contact pads provided on the protective film, wherein the contact pads may include a material that is more flexible and stretchable than the first substrate.

In an embodiment, the vibratory stimulation device may further include ciliated pads in a shape of a fine brush or hair provided on the protective film, wherein one end of each of the ciliated pads may be fixed to an upper surface of the protective film, wherein the other end of each of the ciliated pads may be configured to be freely shaken or bent.

The vibratory stimulation device may further include a protruding contact pad provided on the protective film, wherein the protruding contact pad may include a flat pad portion and protruding portions protruding from the flat pad portion.

In an embodiment, the vibration elements of the vibration element array may be arranged along a first direction and a second direction crossing the first direction on the first substrate.

In an embodiment of the inventive concept, a vibratory stimulation system includes: a vibratory stimulation device including a first substrate, a connection band connected to both sides of the first substrate, and a vibration element array including a plurality of vibration elements provided on the first substrate; a control unit that is individually connected to the vibration elements; and a power supply unit connected to the control unit and configured to supply electrical energy to the vibratory stimulation device and the control unit, wherein each of the vibration elements includes: a stand provided on the first substrate; a vibration film provided on the stand and in contact with the stand at an edge; a vibrator provided on an upper or lower surface of the vibration film; and an electrode wire connecting the vibrator and the control unit, wherein the vibration film includes a material that is more flexible and stretchable than the stand.

In an embodiment, the vibratory stimulation system may further include a second substrate provided between the first substrate and the vibration element array, wherein the second substrate may include a material that is more flexible and stretchable than the first substrate.

In an embodiment, the control unit may induce vibration stimulation of each of the vibration elements simultaneously, sequentially or in a preprogrammed pattern.

In an embodiment, the vibratory stimulation device may be provided in plurality, wherein the first substrates of the vibratory stimulation devices may be connected to each other.

In an embodiment, the vibration film may include PDMS, PMMA, elastomer, silicone, urethane, rubber, polyacrylic, elastic fiber, tape or sponge, wherein the stand may include plastic, curable resin, metal, ceramic, or oxide.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1A:
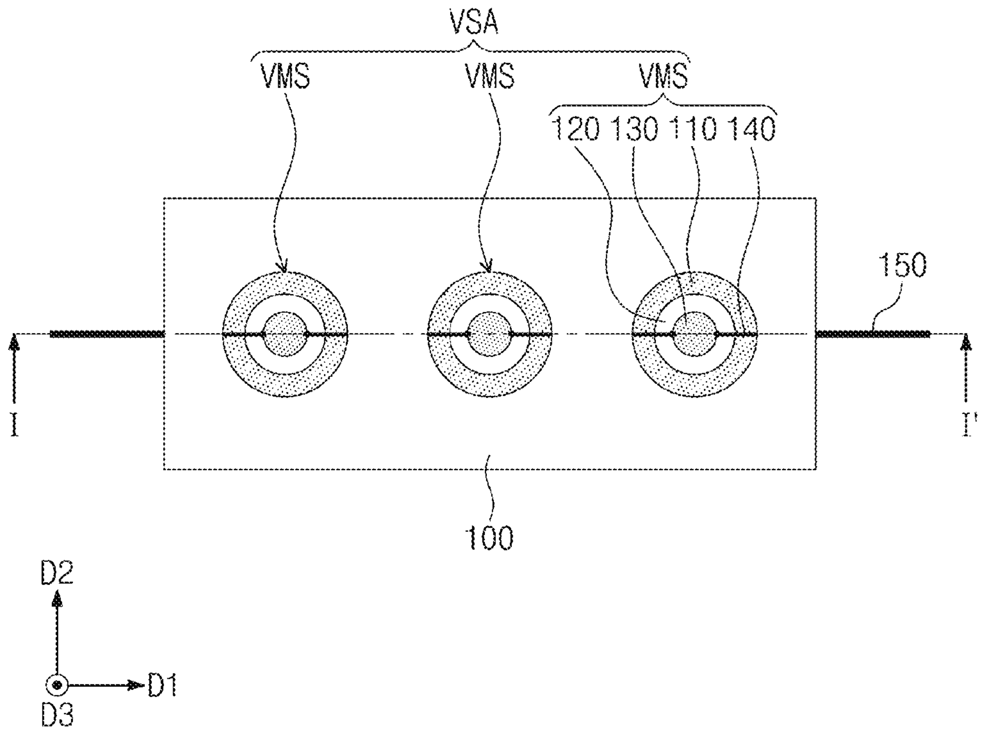
FIGS. 1A and 2A are plan views illustrating vibratory stimulation devices according to embodiments of the inventive concept.

In order to fully understand the configuration and effects of the inventive concept, preferred embodiments of the inventive concept will be described in detail with reference to the accompanying drawings.

The inventive concept is not limited to the embodiments disclosed below, but may be implemented in various forms, and various modifications and changes may be added. However, it is provided to completely disclose the technical idea of the inventive concept through the description of the present embodiments, and to fully inform a person of ordinary skill in the art to which the inventive concept belongs. In the accompanying drawings, the components are shown to be enlarged in size for convenience of description, and the ratio of each component may be exaggerated or reduced.

The terms used in this specification are for describing embodiments and are not intended to limit the inventive concept. In addition, terms used in the present specification may be interpreted as meanings commonly known to those of ordinary skill in the art, unless otherwise defined.

In this specification, the singular form also includes the plural form unless specifically stated in the phrase. As used in the specification, in relation to 'comprises' and/or 'comprising', the mentioned elements, steps, operations and/or elements do not exclude the presence or addition of one or more other elements, steps, operations and/or elements.

In the case where a layer is referred to herein as being 'on' another layer, it may be formed directly on the upper surface of the other layer or a third layer may be interposed therebetween.

In the present specification, terms such as first and second are used to describe various regions, layers, and the like, but these regions and layers should not be limited by these terms. These terms are only used to distinguish one region or layer from another region or layer. Accordingly, a portion referred to as a first portion in one embodiment may be referred to as a second portion in another embodiment. The embodiments described and illustrated herein also include complementary embodiments thereof. Like reference numerals refer to like elements throughout the specification.

Hereinafter, embodiments of a vibratory stimulation device and a vibratory stimulation system including the same according to the inventive concept will be described in detail with reference to the drawings.

Figure 1B:
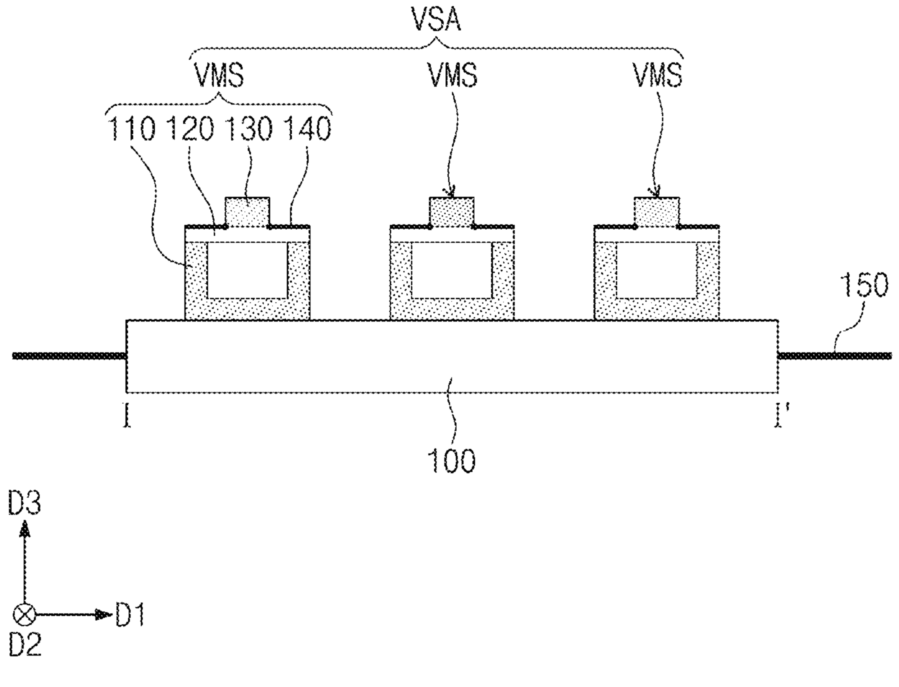
FIGS. 1B, 1C, 1D, 1E, and 2B are cross-sectional views for explaining vibratory stimulation devices according to embodiments of the inventive concept, and correspond to cross-sections taken along the line I-I' in FIGS. 1A and 2A, respectively.

FIG. 1A is a plan view illustrating a vibratory stimulation device according to embodiments of the inventive concept. FIG. 1B is a cross-sectional view illustrating a vibratory stimulation device according to embodiments of the inventive concept, and corresponds to a cross-sectional view of FIG. 1A taken along the line I-I'.

Referring to FIGS. 1A and 1B, the vibratory stimulation device according to the inventive concept may include a substrate 100 and a vibration element array VSA on the substrate 100. The substrate 100 may include, for example, a flexible and stretchable soft material such as PDMS, PMMA, elastomer, silicone, urethane, rubber, polyacrylic, stretchable fiber, tape, or sponge. As another example, the substrate 100 may include a hard material such as plastic.

The substrate 100 may have various shapes, sizes, and forms according to the use. The substrate 100 may have, for example, a hollow rectangular parallelepiped shape, but the inventive concept is not limited thereto. The substrate 100 may have an upper surface parallel to a first direction D1 and a second direction D2 crossing the first direction D1. The upper surface of the substrate 100 may be orthogonal to the third direction D3. The substrate 100 may prevent or minimize the vibration generated by the vibrator 130, which will be described later, from being transmitted to other vibration elements (e.g., Vibrator-Membrane-Stand (VMS)). Accordingly, vibration interference between the vibration elements VMS may be attenuated.

The vibration element array VSA may include a plurality of vibration elements VMS arranged along the first direction D1. The plurality of vibration elements VMS may be spaced apart from each other in the first direction D1.

Hereinafter, for convenience of description, a single number of vibration elements VMS will be described, but the following description may be equally applied to other vibration elements VMS. The vibration element VMS may include a stand 110, a vibration film 120, a vibrator 130, and an electrode wire 140.

The stand 110 may be provided on the substrate 100 and may contact the upper surface of the substrate 100. The stand 110 may have, for example, a cylindrical or polygonal column shape with an open top. As another example, the stand 110 may have a cylindrical or polygonal column shape with both upper and lower portions open. That is, the stand 110 may have a cylindrical or polygonal column shape in which at least one of the upper and lower portions is open. As another example, the stand 110 may include a flat plate (e.g., a disk or a polygonal plate) and at least two or more pillars on the flat plate. As another example, the stand 110 may include a circular ring or a polygonal ring and at least two or more pillars on the ring. As another example, the stand 110 may include only at least two or more pillars without a plate or a ring. As another example, when the substrate 100 includes a hard and rigid material, the stand 110 may be manufactured integrally with the substrate 100 by processing the substrate 100 (see FIG. 1D and FIG. 1E). The stand 110 may include, for example, a variety of materials having a hard and rigid property such as plastic, hardened resin, metal, ceramic, oxide, and the like.

The vibration film 120 may be provided on the stand 110 and may contact the stand 110 at its edge. The vibration film 120 may be adhered to the stand 110 through an adhesive. The vibration film 120 may have, for example, a disk or polygonal plate shape. As another example, the vibration film 120 may have a shape of a circular plate or a polygonal plate in which a part is empty, and its shape may be changed according to the upper surface of the stand 110. The vibration film 120 may include, for example, a flexible and stretchable soft material such as PDMS, PMMA, elastomer, silicone, urethane, rubber, polyacrylic, stretchable fiber, tape, or sponge. The elastic modulus (or Young's modulus) of the vibration film 120 may be several MPa or less. The elastic modulus (or Young's modulus) of the vibration film 120 may be selected differently according to a desired frequency of vibration. The vibration film 120 may prevent or minimize the vibration generated by the vibrator 130 to be described later from being transmitted to the stand 110. Accordingly, vibration interference between the vibration elements VMS may be attenuated.

The space surrounded by the lower surface of the vibration film 120 and the upper surface and the inner wall of the stand 110 may be filled with air. The stand 110 and/or the vibration film 120 may include air holes through which air may freely enter.

The stand 110 and the vibration film 120 may be integrally formed, for example, by fixing the stand 110 on the liquid PDMS and solidifying the liquid PDMS into a solid state.

The vibrator 130 may be provided on the vibration film 120, and may be adhered to or contact with the upper or lower surface of the vibration film 120. The vibrator 130 may generate vibration according to an applied electric signal. The vibrator 130 may be, for example, an eccentric rotating mass (ERM), a linear resonator actuator (LRA), or a piezoelectric actuator. The vibrator 130 may have, for example, a shape such as a cylinder, a polygonal column, or a rectangular parallelepiped. For example, the vibrator 130 may have a multilayer thin film structure (in the case of a piezoelectric actuator).

The electrode wire 140 may be provided on the vibration film 120. One end of the electrode wire 140 may be connected to the vibrator 130. The other end of the electrode wire 140 may be connected to a control unit 1100 (see FIG. 26) and/or a power supply unit 1200 (see FIG. 26) provided inside or outside the substrate 100. When the control unit 1100 (see FIG. 26) and/or the power supply unit 1200 (see FIG. 26) is provided outside of the substrate 100, the electrode wire 140 may be connected to the outside through a hole in the substrate 100. The electrode wire 140 may transmit an electrical signal to the vibrator 130. The electrode wire 140 may be, for example, a wire coated with an insulating material, or may be a wiring provided on the stand 110 and/or the substrate 100 or provided inside the stand 110 and/or the substrate 100.

The connection band 150 may be connected to both sides of the substrate 100. Part of the connection band 150 may include Velcro or a patch having adhesive force. The connection band 150 may have a clothing shape such as a thimble, a glove, a wrist band, socks, a mask, and a helmet, and may help to fix and/or adhere the vibratory stimulation device according to the invention to the skin (e.g., face, head, hand, fingers, etc.).

Figure 1C:
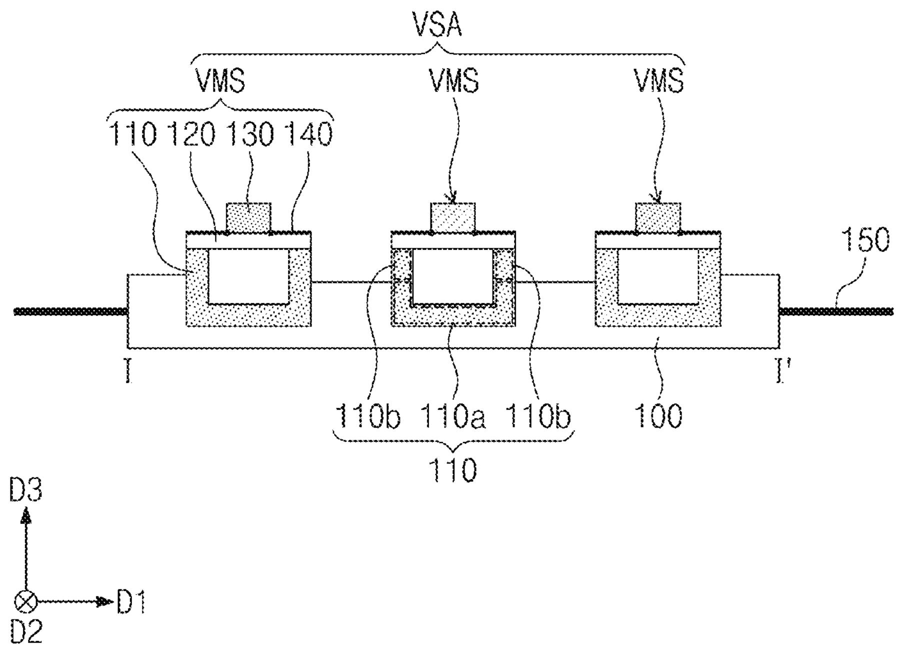
Figure 1D:
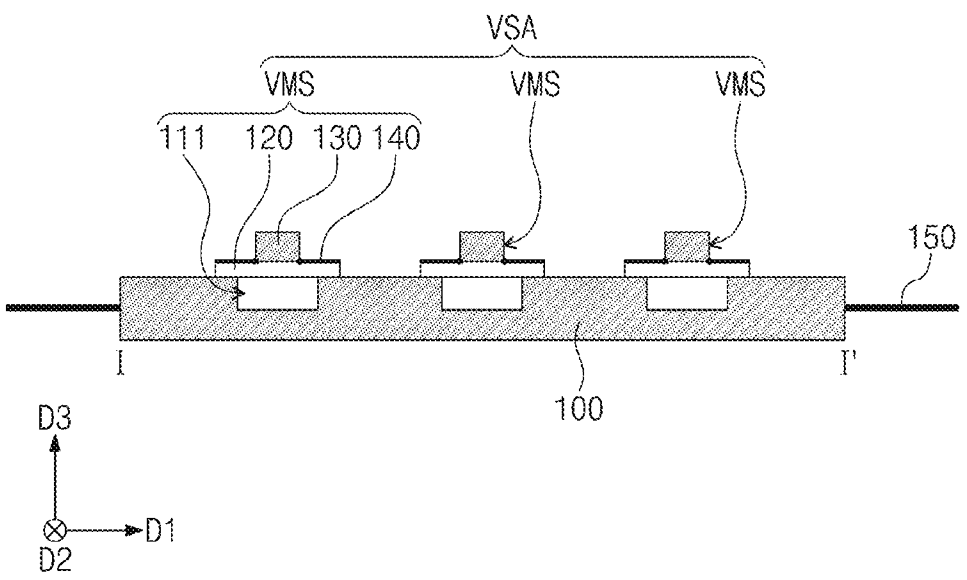
Figure 1E:
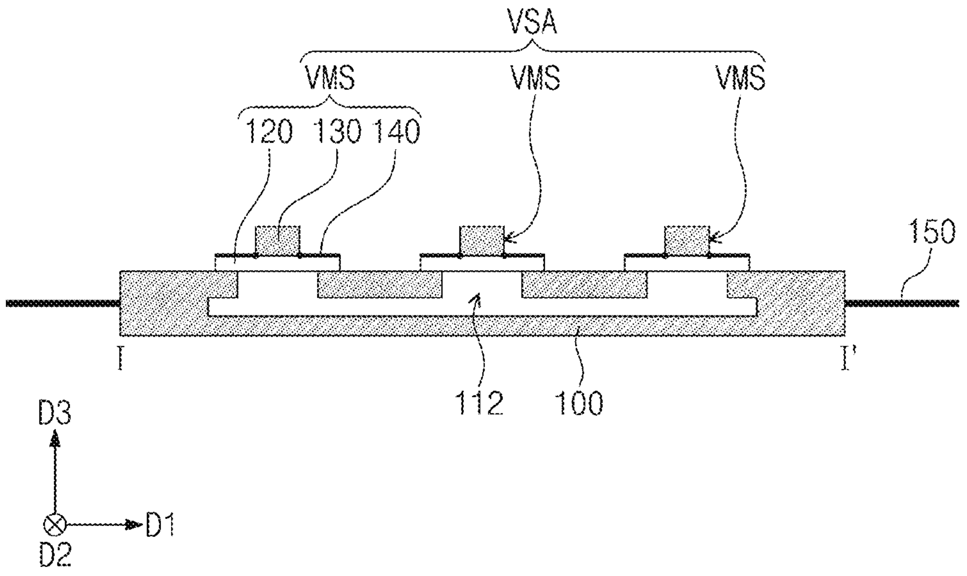

FIGS. 1C, 1D, and 1E are cross-sectional views for explaining a vibratory stimulation device according to embodiments of the inventive concept, and correspond to a cross-section taken along the line I-I' in FIG. 1A. For convenience of explanation, descriptions of substantially the same matters as those described with reference to FIGS. 1A and 1B will be omitted, and differences will be described in detail.

Referring to FIGS. 1A and 1C, at least a portion of the vibration element VMS may be embedded into the substrate 100. More specifically, at least a portion of the stand 110 of the vibration element VMS may be embedded into the substrate 100.

The stand 110 is, for example, may include a first portion 110*a* positioned at a level lower than the upper surface 100*t* of the substrate 100 and a second portion 110*b* positioned at a level higher than the upper surface 100*t* of the substrate 100. However, this is only exemplary, and the inventive concept is not limited thereto, and as another example, the entire stand 110 may be positioned at a level lower than the upper surface 100*t* of the substrate 100.

The vibration element VMS in which at least part of the vibration element is embedded into the substrate 100 may have stronger adhesion to the substrate 100 than in the case of FIG. 1B. At least a part of the vibration element VMS is embedded into the substrate 100 so that damage to the vibration element VMS due to external impact and/or contamination may be prevented or minimized.

Referring to FIGS. 1A, 1D and 1E, when the substrate 100 includes a hard and rigid material, the substrate 100 may be processed so that a part of the substrate 100 serves as a stand. The vibration film 120 may be supported by a portion of the substrate 100.

As shown in FIG. 1D, the substrate 100 may have a plurality of cavities 111 under the plurality of vibration elements VMS. Each of the cavities 111 may be provided under the vibration film 120 of each of the vibration elements VMS, and the vibration film 120 of each of the vibration elements VMS may be supported by a portion of the substrate 100 adjacent to each of the cavities 111.

As shown in FIG. 1E, the substrate 100 may have one cavity 112 under a plurality of vibration elements VMS. The cavity 112 may be one space connected under the vibration element array VSA. In other words, the vibratory stimulation device according to FIG. 1E may have a structure in which a plurality of cavities 111 of the vibratory stimulation device according to FIG. 1D are connected as one.

Figure 2A:
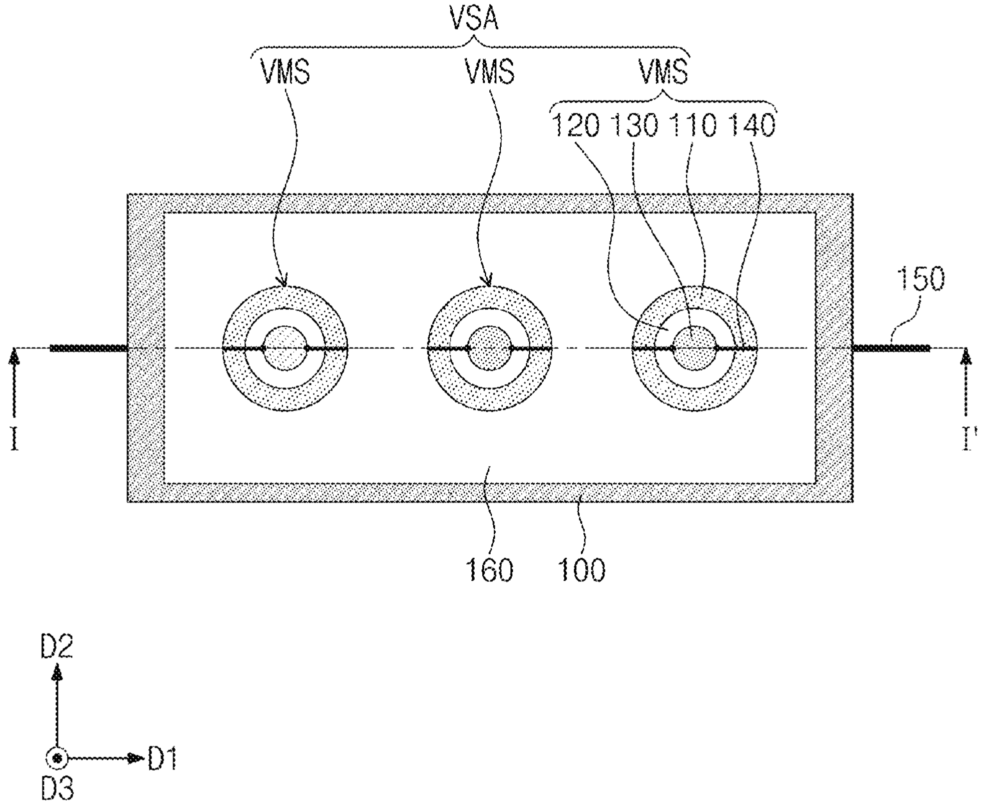
Figure 2B:
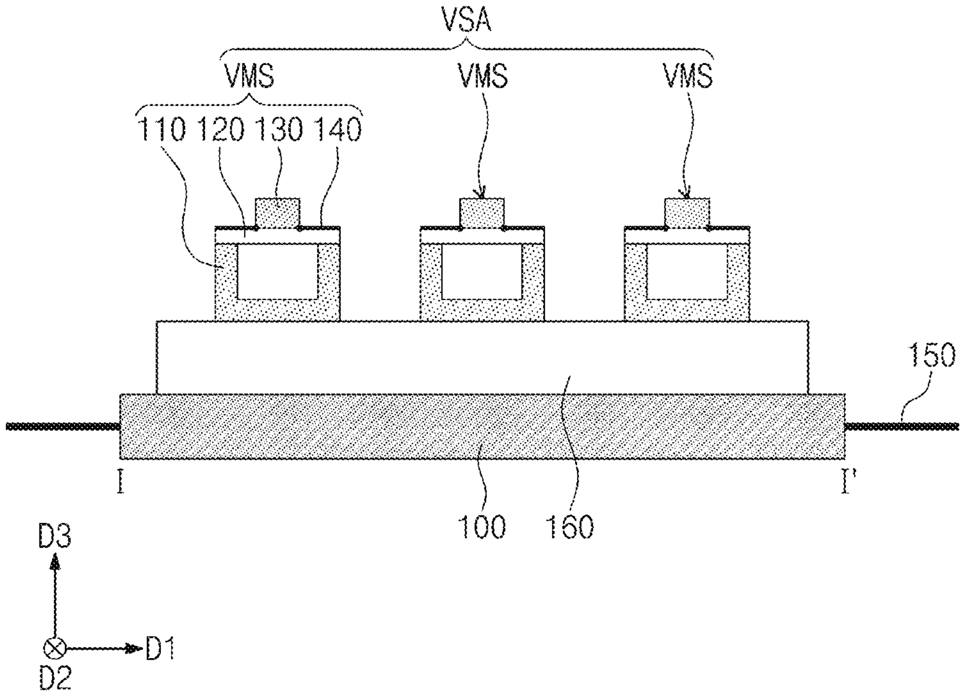

FIG. 2A is a plan view illustrating a vibratory stimulation device according to embodiments of the inventive concept. FIG. 2B is a cross-sectional view illustrating a vibratory stimulation device according to embodiments of the inventive concept, and corresponds to a cross-sectional view of FIG. 2A taken along the line I-I'. For convenience of explanation, descriptions of substantially the same matters as those described with reference to FIGS. 1A to 1E will be omitted, and differences will be described in detail.

Referring to FIGS. 2A and 2B, the vibratory stimulation device according to the inventive concept may include a first substrate 100 connected to the connection band 150 at both sides, a second substrate 160 on the first substrate 100, and a vibration element array VSA on the second substrate 160. The second substrate 160 may be provided between the first substrate 100 and the vibration element array VSA.

The first substrate 100 may include, for example, a hard and rigid material such as plastic, cured resin, metal, ceramic, and the like, and the second substrate 160 may include, for example, a flexible and elastic soft material such as PDMS, PMMA, elastomer, silicone, urethane, rubber, polyacrylic, elastic fiber, tape, or sponge. The first substrate 100 and the second substrate 160 may have various shapes, sizes, and forms according to a body part to which vibration stimulation is to be transmitted. The second substrate 160 may have, for example, a hollow rectangular parallelepiped shape, but the inventive concept is not limited thereto. In particular, the first substrate 100 may be designed and manufactured in advance according to the shape of a body part to which vibration stimulation is to be transmitted. The lower surface of the second substrate 160 may be entirely adhered to the upper surface of the first substrate 100, but the inventive concept is not limited thereto, and only a part of the lower surface of the second substrate 160 may be fixed to the upper surface of the first substrate 100.

FIGS. 3A, 4A, 5A, 6A, 7A, and 8A are conceptual diagrams illustrating vibratory stimulation devices according to embodiments of the inventive concept. FIGS. 3B, 4B, 5B, 6B, 7B, and 8B are conceptual diagrams showing vibration displacement at the lowest resonant frequency as a three-dimensional image when voltage is applied to the vibratory stimulation devices of FIGS. 3A to 8A, respectively.

More specifically, FIGS. 3B to 8B show a state in which a voltage of about 100 V is applied only to the left vibrator, and show a three-dimensional image of the vibration displacement at the lowest resonant frequency using a finite element analysis (FEA) method.

In FIGS. 3A to 8A and 3B to 8B, each of the vibrators 130 may be a piezoelectric actuator including lead zirconate titanate (PZT) (Pb[ZrxTi1-x]O3 ($0 \leq x \leq 1$)). The interval of the vibrators 130 may be about 12 mm, and each of the vibrators 130 may have a thickness of about 2.5 mm and a diameter of about 5 mm. Hereinafter, the interval of certain components means the distance between the centers of the corresponding components.

Figure 3A:
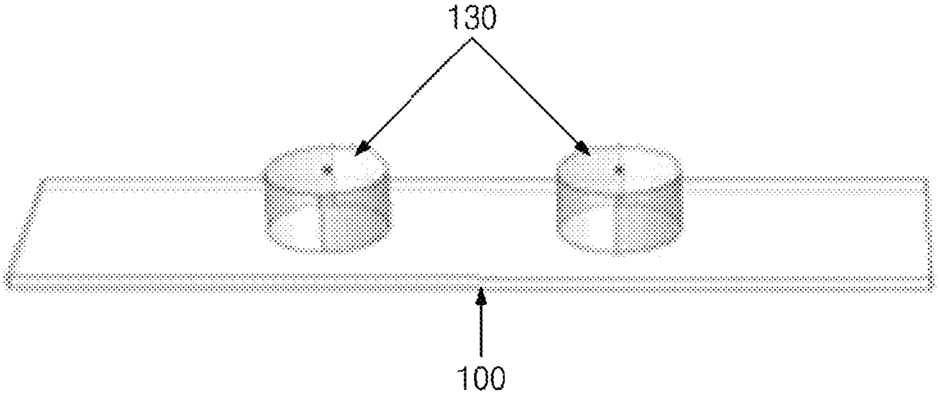
FIGS. 3A, 4A, 5A, 6A, 7A, and 8A are conceptual diagrams illustrating vibratory stimulation devices according to embodiments of the inventive concept.
Figure 3B:
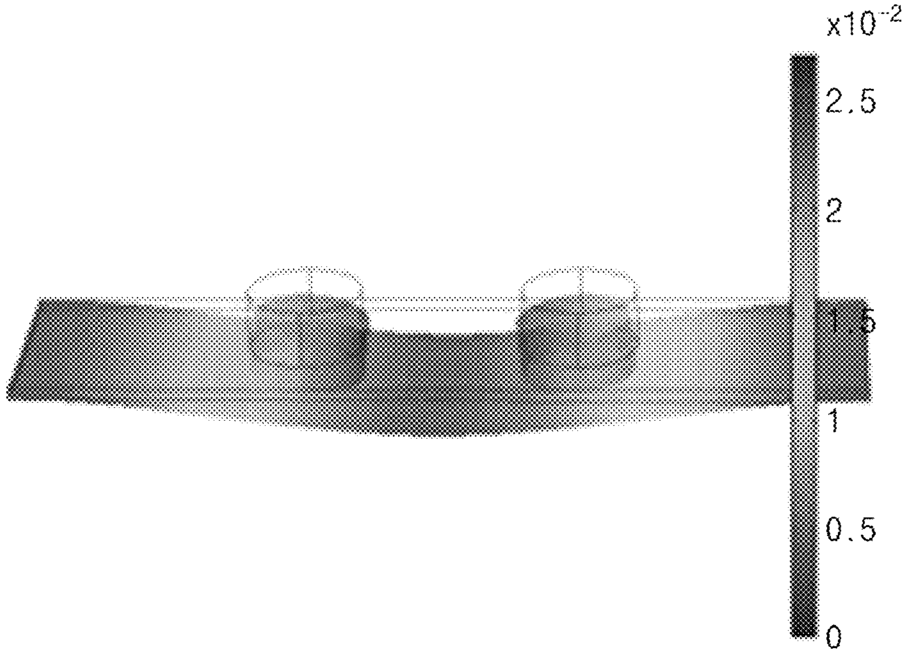
FIGS. 3B, 4B, 5B, 6B, 7B, and 8B are conceptual diagrams showing vibration displacement at the lowest resonant frequency as a three-dimensional image when voltage is applied to the vibratory stimulation devices of FIGS. 3A to 8A, respectively.

Referring to FIGS. 3A and 3B, a pair of vibrators 130 may be provided on the first substrate 100. The first substrate 100 may include polycarbonate.

The first substrate 100 may have a thickness of about 0.5 mm, a width of about 10 mm, and a length of about 37 mm.

In the condition that the left and right sides of the first substrate 100 are fixed, when a voltage of about 100 V is applied only to the left vibrator among the vibrators 130 (e.g., a voltage is applied between the upper and lower surfaces of the left vibrator), the lowest resonant frequency may be about 307.2 Hz.

Figure 4A:
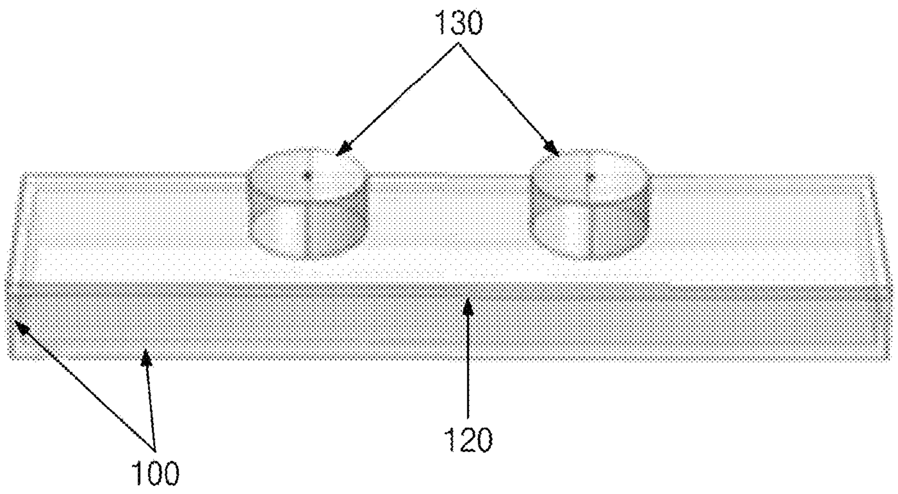
Figure 4B:
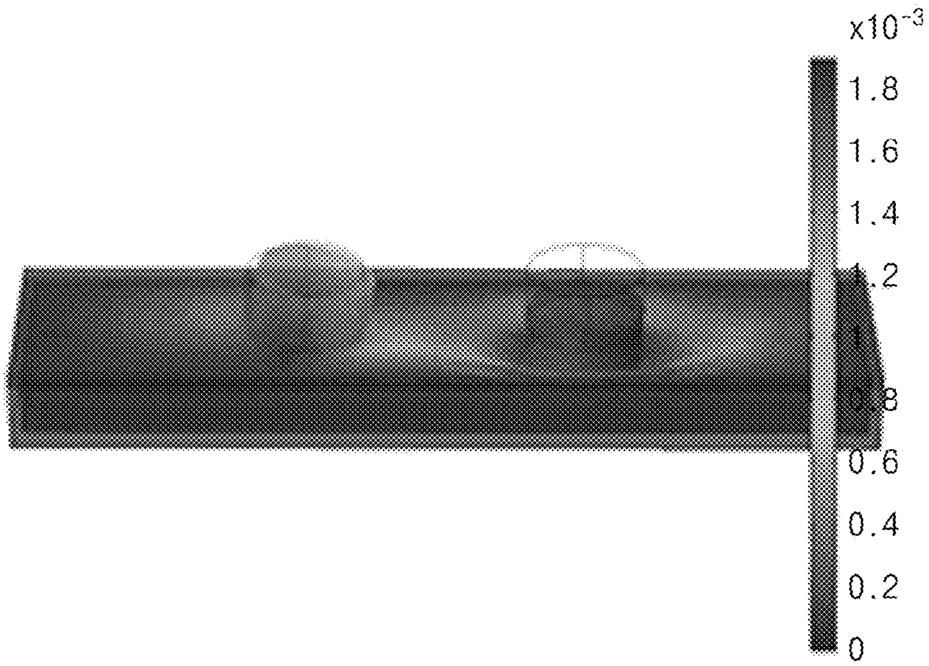

Referring to FIGS. 4A and 4B, a vibration film 120 may be provided on the first substrate 100 having a box shape, and a pair of vibrators 130 may be provided on the vibration film 120. The first substrate 100 may include polycarbonate, and the vibration film 120 may include PDMS.

The first substrate 100 has a thickness of about 0.5 mm (the thickness of the edge of the first substrate 100), a width of about 10 mm, a height of about 3 mm (the thickness of the entire first substrate 100), and a length of about 37 mm. The vibration film 120 may have a thickness of about 0.5 mm, a width of about 10 mm, and a length of about 37 mm.

In the condition that the bottom surface of the first substrate 100 is fixed, when a voltage of about 100 V is applied only to the left vibrator among the vibrators 130 (e.g., a voltage is applied between the upper and lower surfaces of the left vibrator), the lowest resonant frequency may be about 86.5 Hz.

Figure 5A:
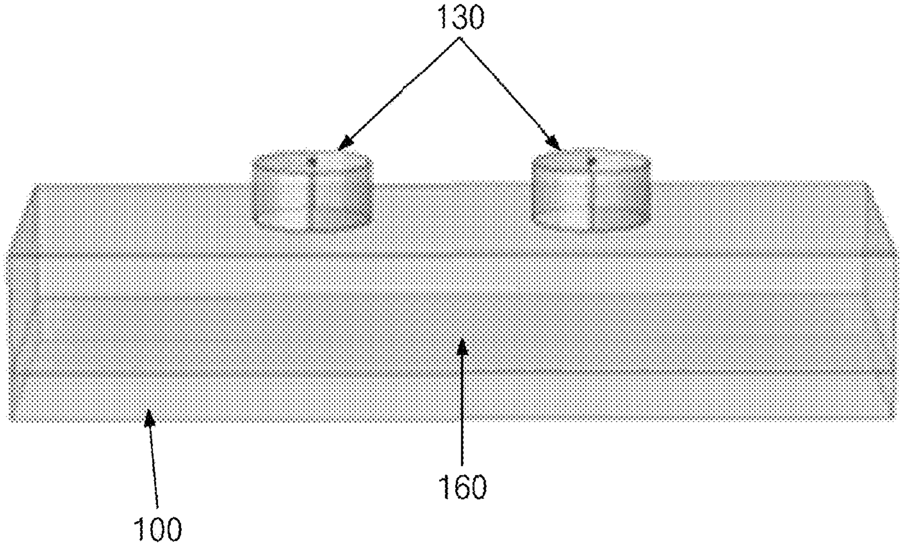
Figure 5B:
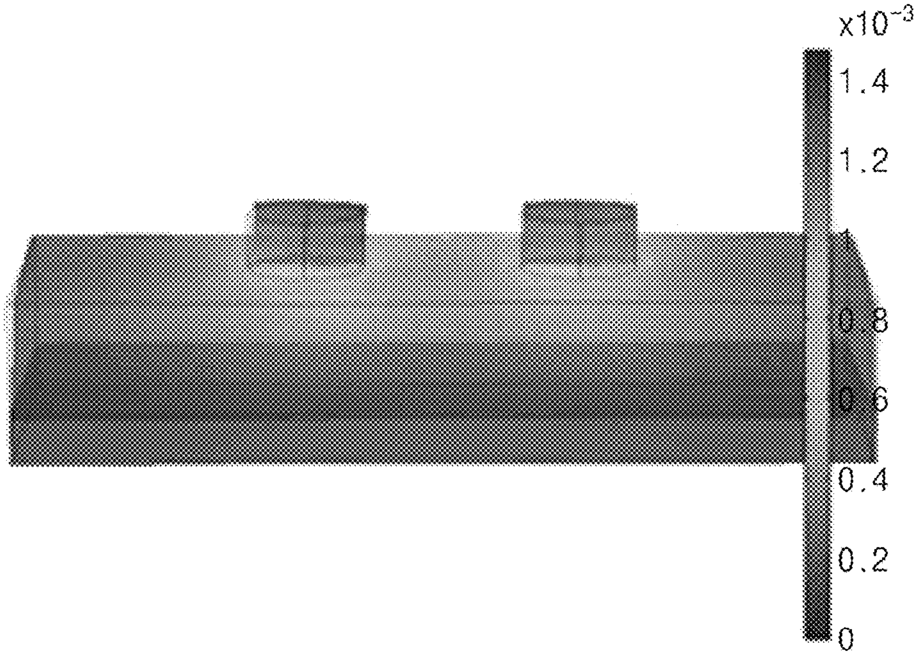

Referring to FIGS. 5A and 5B, a second substrate 160 may be provided on the first substrate 100, and a pair of vibrators 130 may be provided on the second substrate 160. The first substrate 100 may include polycarbonate, and the second substrate 160 may include PDMS.

The first substrate 100 may have a thickness of about 2 mm, a width of about 15 mm, and a length of about 37 mm. The second substrate 160 may have a thickness of about 5 mm, a width of about 15 mm, and a length of about 37 mm.

In the condition that the left and right sides of the first substrate 100 are fixed, when a voltage of about 100 V is applied only to the left vibrator among the vibrators 130 (e.g., a voltage is applied between the upper and lower surfaces of the left vibrator), the lowest resonant frequency may be about 430.7 Hz.

Figure 6A:
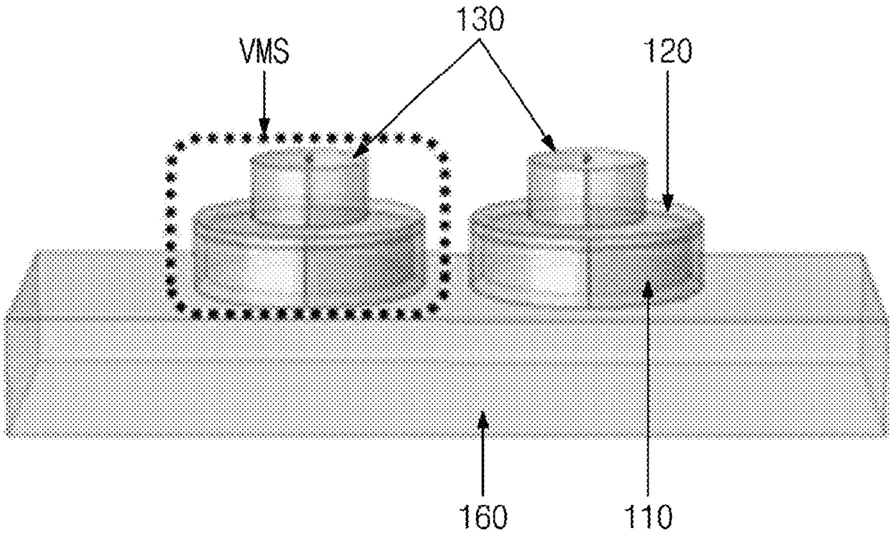
Figure 6B:
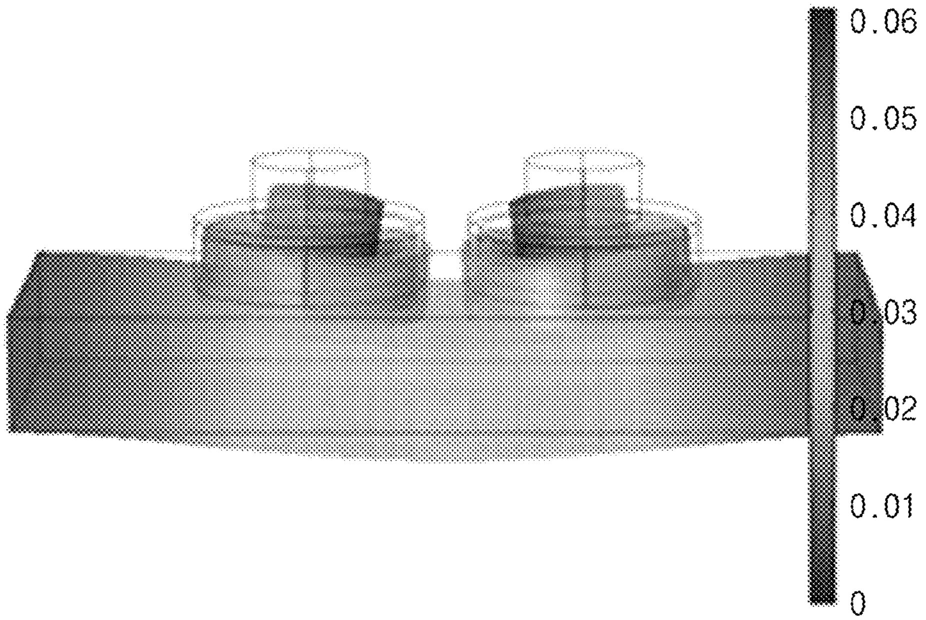

Referring to FIGS. 6A and 6B, a pair of vibration elements VMS may be provided on the second substrate 160. Each of the vibration elements VMS may include a stand 110, a vibration film 120 on the stand 110, and a vibrator 130 on the vibration film 120. The second substrate 160 and the vibration film 120 may include PDMS, and the stand 110 may include polycarbonate.

The second substrate 160 may have a thickness of about 5 mm, a width of about 15 mm, and a length of about 37 mm. The stand 110 may have a height of about 2.5 mm and a diameter of about 10 mm. The vibration film 120 may have a thickness of about 0.5 mm.

In the condition that the left and right sides of the second substrate 160 are fixed, when a voltage of about 100 V is applied only to the left vibrator among the vibrators 130 (e.g., a voltage is applied between the upper and lower surfaces of the left vibrator), the lowest resonant frequency may be about 84.6 Hz.

Figure 7A:
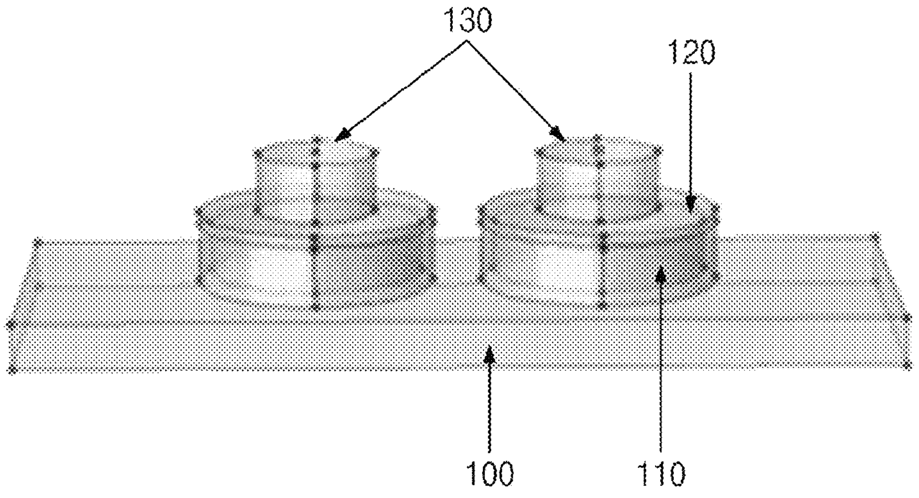
Figure 7B:
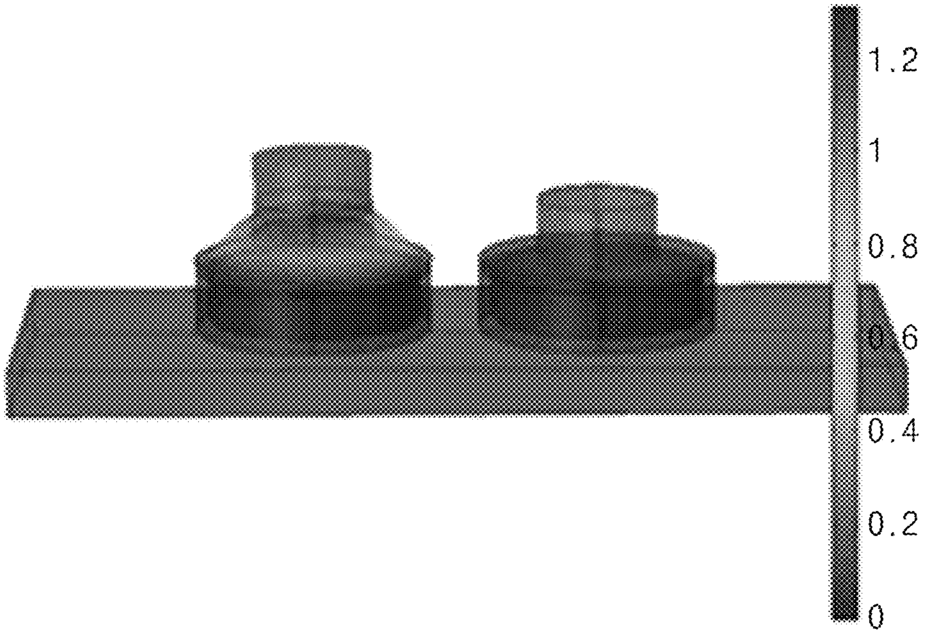

Referring to FIGS. 7A and 7B, a pair of vibration elements VMS may be provided on the first substrate 100. Each of the vibration elements VMS may include a stand 110, a vibration film 120 on the stand 110, and a vibrator 130 on the vibration film 120. The vibration film 120 may include PDMS, and the first substrate 100 and the stand 110 may include polycarbonate.

The first substrate 100 may have a thickness of about 2 mm, a width of about 15 mm, and a length of about 37 mm. The stand 110 may have a height of about 2.5 mm and a diameter of about 10 mm. The vibration film 120 may have a thickness of about 0.5 mm.

In the condition that the left and right sides of the first substrate 100 are fixed, when a voltage of about 100 V is applied only to the left vibrator among the vibrators 130 (e.g., a voltage is applied between the upper and lower surfaces of the left vibrator), the lowest resonant frequency may be about 132.7 Hz.

Figure 8A:
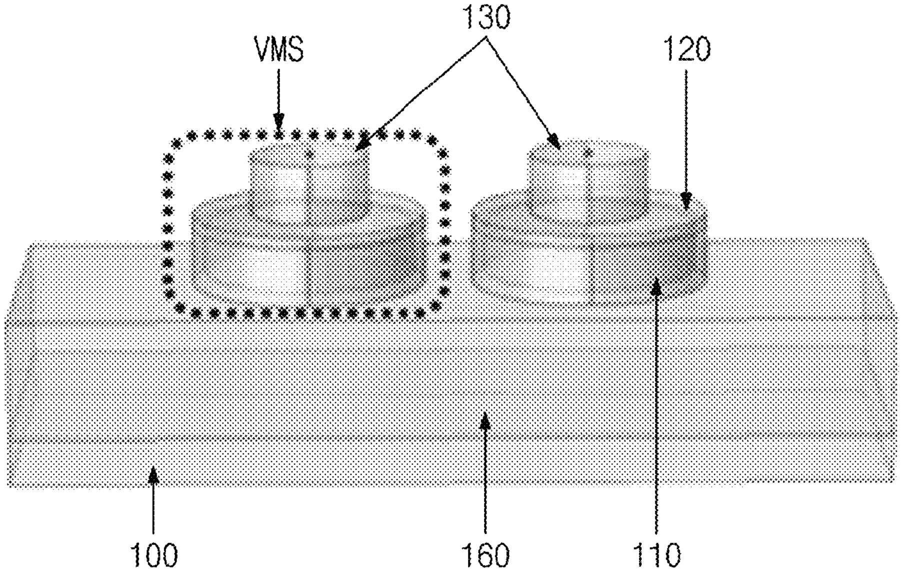
Figure 8B:
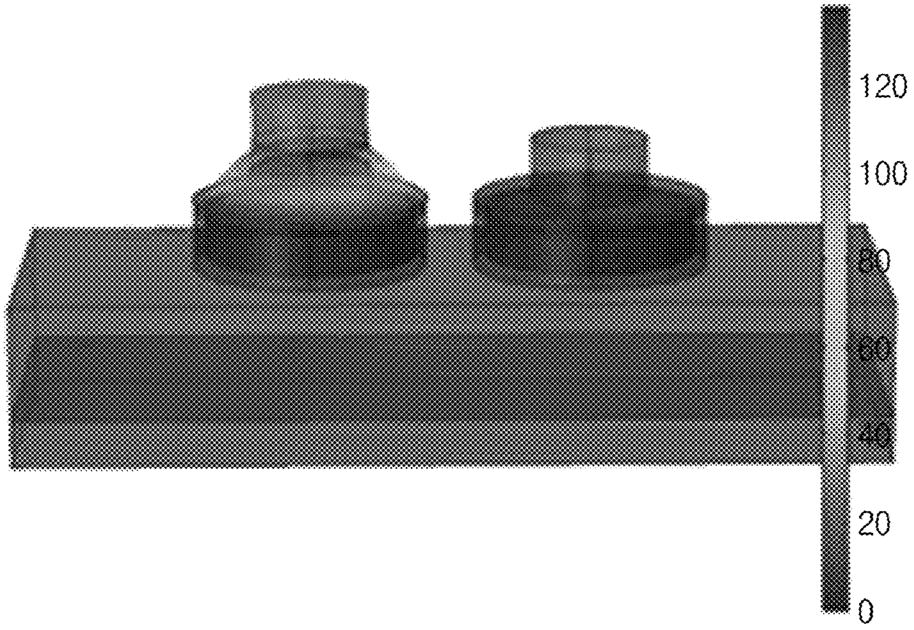

Referring to FIGS. 8A and 8B, a second substrate 160 may be provided on the first substrate 100, and a pair of vibration elements VMS may be provided on the second substrate 160. Each of the vibration elements VMS may include a stand 110, a vibration film 120 on the stand 110, and a vibrator 130 on the vibration film 120. The second substrate 160 and the vibration film 120 may include PDMS, and the first substrate 100 and the stand 110 may include polycarbonate.

The first substrate 100 may have a thickness of about 2 mm, a width of about 15 mm, and a length of about 37 mm. The second substrate 160 may have a thickness of about 5 mm, a width of about 15 mm, and a length of about 37 mm. The stand 110 may have a height of about 2.5 mm and a diameter of about 10 mm. The vibration film 120 may have a thickness of about 0.5 mm.

In the condition that the left and right sides of the first substrate 100 are fixed, when a voltage of about 100 V is applied only to the left vibrator among the vibrators 130 (e.g., a voltage is applied between the upper and lower surfaces of the left vibrator), the lowest resonant frequency may be about 132.2 Hz.

The results of FIGS. 3A, 3B, 4A, 4B, 5A, 5B, 6A, 6B, 7A, 7B, 8A, and 8B are summarized in Table 1 below. At this time, $R_{on/off}$ represents the ratio of the vibration displacement of the left vibrator to the vibration displacement of the right vibrator.

TABLE 1

| FIGS. | Vibration displacement of left vibrator (μm) | Vibration displacement of right vibrator (μm) | Vibration frequency (Hz) | $R_{on/off}$ |
|---|---|---|---|---|
| 3a, 3b | 2715 | 2714 | 307.2 | 1 |
| 4a, 4b | 35 | 439 | 86.5 | 0.08 |
| 5a, 5b | 0.08 | 0.01 | 430.7 | 8 |
| 6a, 6b | 1158 | 1144 | 84.6 | 1 |
| 7a, 7b | 464 | 24 | 132.7 | 19 |
| 8a, 8b | 1695 | 36 | 132.2 | 47 |

As the vibration displacement of the left vibrator with voltage applied is greater than the vibration displacement of the right vibrator without voltage, and the magnitude of the vibration displacement of the left vibrator is greater, vibration interference may be well attenuated. That is, in the case of FIGS. 7A and 7B and the case of FIGS. 8A and 8B, vibration interference may be more attenuated.

FIGS. 9A, 10A, 11A, and 12A are cross-sectional views illustrating vibratory stimulation devices according to embodiments of the inventive concept. FIGS. 9B, 10B, 11B, and 12B are graphs showing vibration displacement spectra when voltage is applied to vibration elements of the vibratory stimulation devices of FIGS. 9A to 12A, respectively.

More specifically, FIGS. 9B to 12B are graphs measuring vibration displacement spectra from about 150 Hz to about 1 kHz in 1.25 Hz units using a laser vibrometer with a sine wave voltage of about 0.5 Vrms (i.e., AC voltage) applied only to the left vibrator. In this case, the measured vibration displacement may be a relative value set as the reference point to the surface of the vibrator 131. Since the unit of the measured vibration displacement is nm and the measurement result is the result of the frequency scan mode, when a genuine sine wave voltage is applied, it may show a vibration displacement that is tens of times larger.

In FIGS. 9A to 12A and 9B to 12B, each of the vibrators 131 has a resonant frequency of about 240 Hz, and the operating voltage may be a linear resonator actuator (LRA) of about 0.1 to about 1.9 Vrms. The interval of the vibrators 131 may be about 25 mm, and each of the vibrators 131 may have a thickness of about 2.5 mm and a diameter of about 8 mm.

Figure 9A:
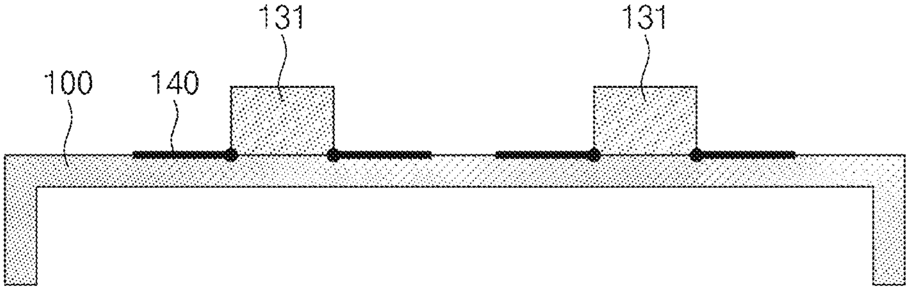
FIGS. 9A, 10A, 11A, 12A, 13A, 14A, 15A, and 16A are cross-sectional views illustrating vibratory stimulation devices according to embodiments of the inventive concept.

Referring to FIG. 9A, a pair of vibrators 131 connected to the electrode wire 140 may be provided on the first substrate 100. The first substrate 100 may be a rigid disk-shaped plastic substrate. The first substrate 100 may have a diameter of about 147 mm.

Figure 9B:
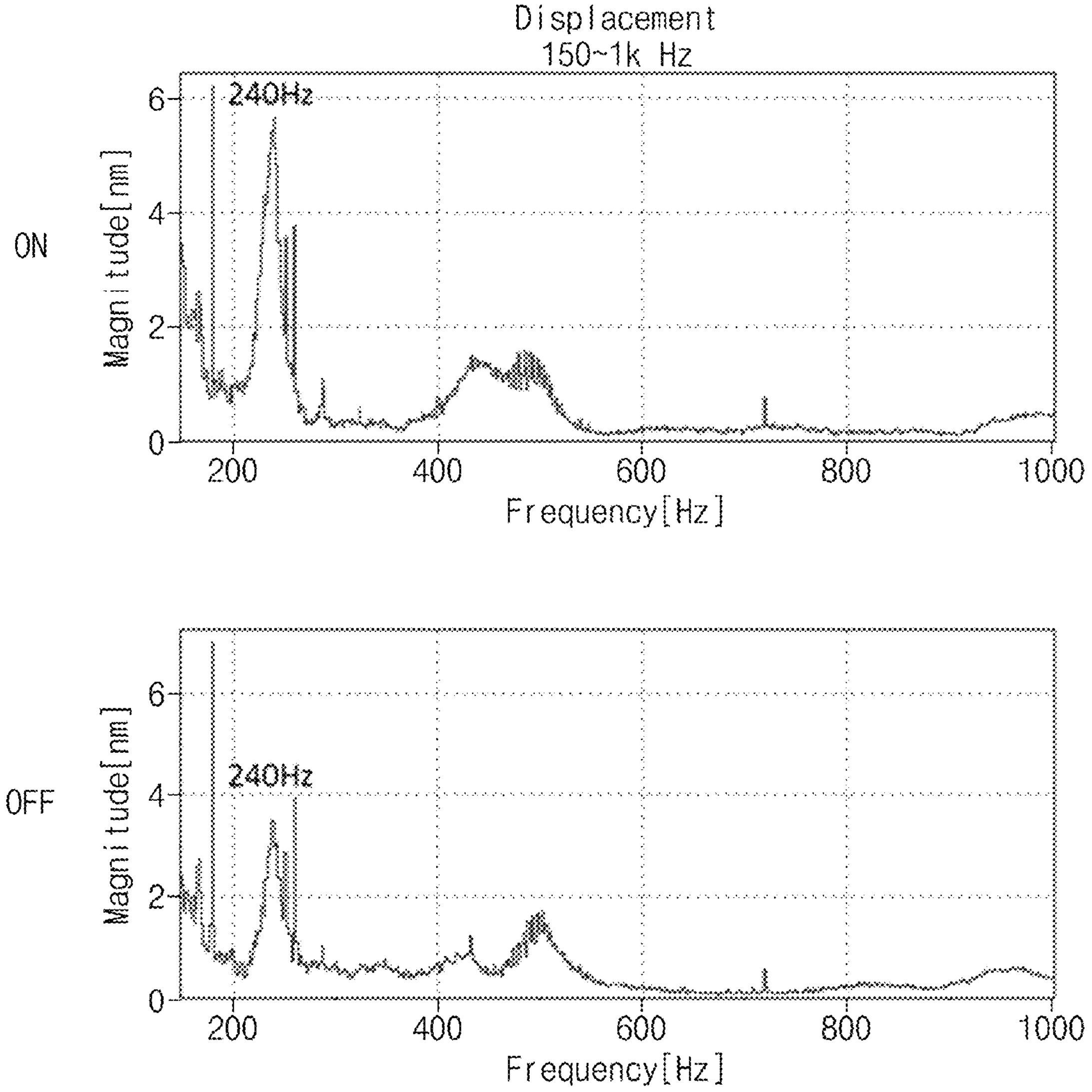
FIGS. 9B, 10B, 11B, 12B, 13B, 14B, 15B and 16B are graphs showing vibration displacement spectra when voltage is applied to the vibration elements of the vibratory stimulation devices of FIGS. 9A to 16A, respectively.

Referring to FIG. 9B, the resonant frequency in both the left vibrator (On) and the right vibrator (Off) is about 240 Hz. The vibration displacement spectrum of each of the left vibrator (On) and the right vibrator (Off) is not large, and the vibration displacement is relatively small compared to other cases. This is a result showing that vibration interference is very large because the vibration of the left vibrator (On) is transmitted to the right vibrator (Off) through the first substrate 100.

Figure 10A:
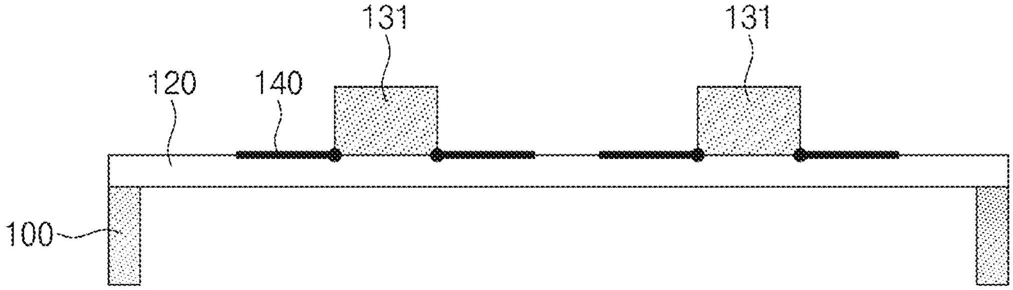

Referring to FIG. 10A, a vibration film 120 may be provided on the first substrate 100, and a pair of vibrators 131 connected to the electrode wire 140 may be provided on the vibration film 120. The first substrate 100 may be a box-shaped hard plastic substrate. The first substrate 100 may have a width of about 62 mm and a length of about 97 mm. The vibration film 120 may include PDMS. The vibration film 120 may have a width of about 62 mm, a length of about 47 mm, and a thickness of about 300 μm.

Figure 10B:
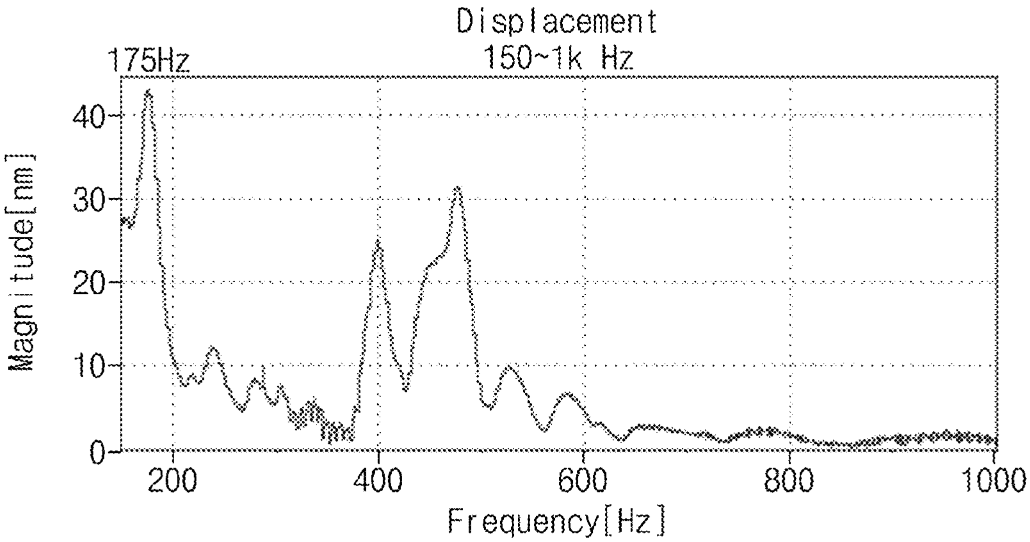
Figure 10B:
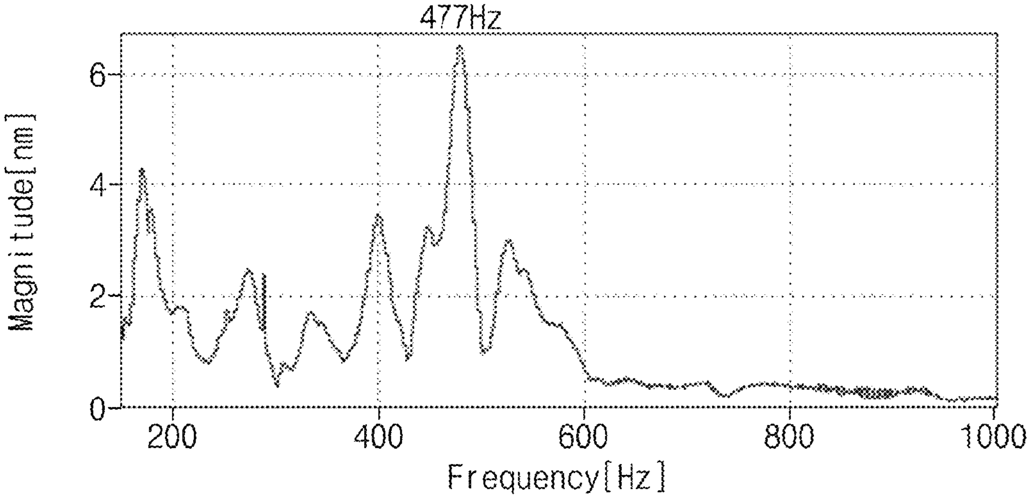

Referring to FIG. 10B, one of the resonant frequencies of the left vibrator (On) is about 175 Hz, and one of the resonant frequencies of the right vibrator (Off) is about 477 Hz. The vibration displacement of FIG. 10B is greater than that of FIG. 9B. The vibration displacement spectra of each of the left vibrator (On) and the right vibrator (Off) represent various vibration modes and complex spectra. This is a result showing that the vibration interference between the vibrators 131 connected by the vibration film 120 is large.

Figure 11A:
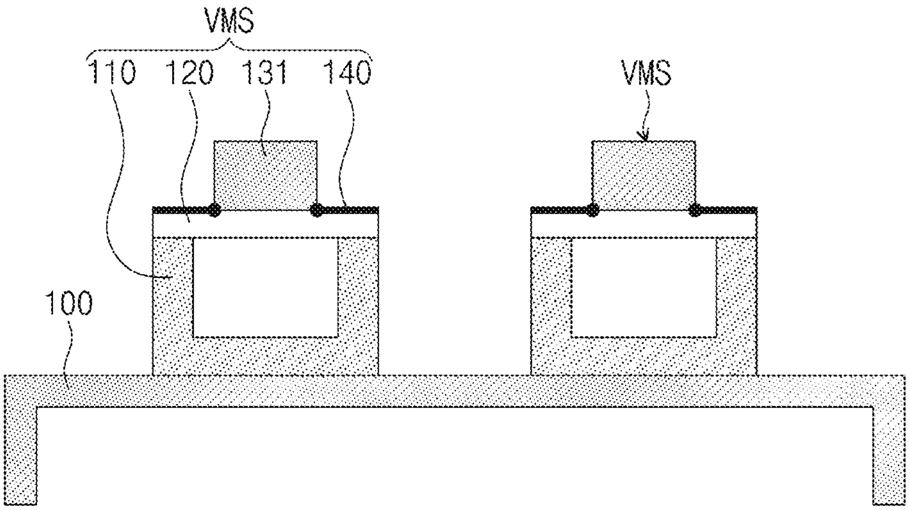

Referring to FIG. 11A, a pair of vibration elements VMS may be provided on the first substrate 100. Each of the vibration elements VMS may include a stand 110, a vibration film 120 on the stand 110, and a vibrator 131 connected to the electrode wire 140 on the vibration film 120.

The first substrate 100 may be a rigid disk-shaped plastic substrate. The first substrate 100 may have a diameter of about 147 mm. The stand 110 may include a cured resin. The stand 110 may have a height of about 5 mm and a diameter of about 20 mm. The vibration film 120 may include PDMS. The vibration film 120 may have a thickness of about 0.3 mm.

Figure 11B:
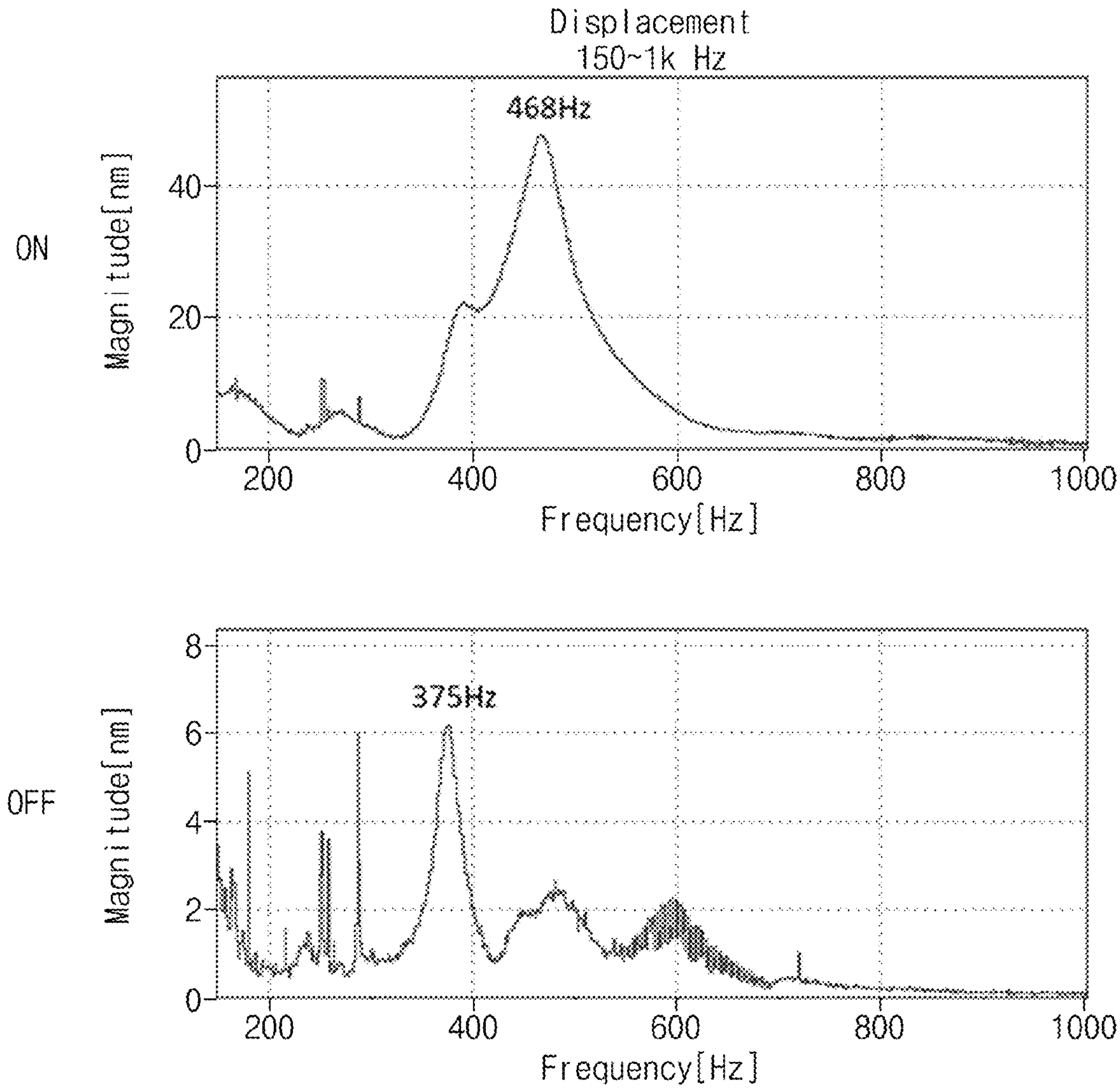

Referring to FIG. 11B, the resonant frequency of the left vibrator (On) is about 468 Hz, and one of the resonant frequencies of the right vibrator (Off) is about 375 Hz. At this time, the vibration displacement of the left vibrator (On) is greater than the vibration displacement of the right vibrator (Off). This is a result showing that the vibration interference between the vibration elements VMS and the first substrate 100 and the vibration interference between the vibration elements VMS are very small.

Figure 12A:
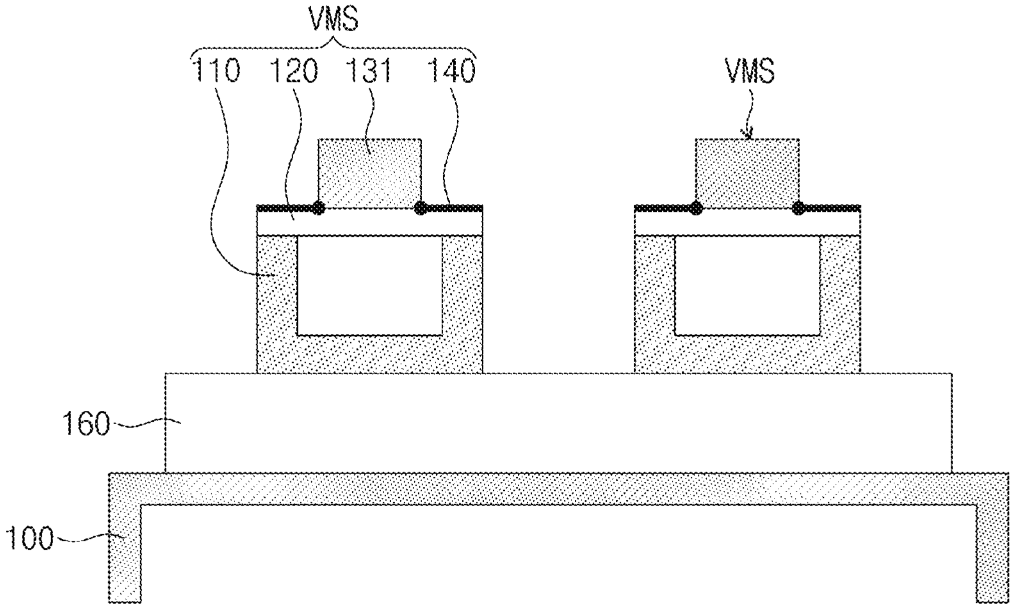

Referring to FIG. 12A, a second substrate 160 may be provided on the first substrate 100, and a pair of vibration elements VMS may be provided on the second substrate 160. Each of the vibration elements VMS may include a stand 110, a vibration film 120 on the stand 110, and a vibrator 131 connected to the electrode wire 140 on the vibration film 120.

The first substrate 100 may be a rigid disk-shaped plastic substrate. The first substrate 100 may have a diameter of about 147 mm. The second substrate 160 may include polyurethane. The stand 110 may include a cured resin. The stand 110 may have a height of about 5 mm and a diameter of about 20 mm. The vibration film 120 may include PDMS. The vibration film 120 may have a thickness of about 0.3 mm.

Figure 12B:
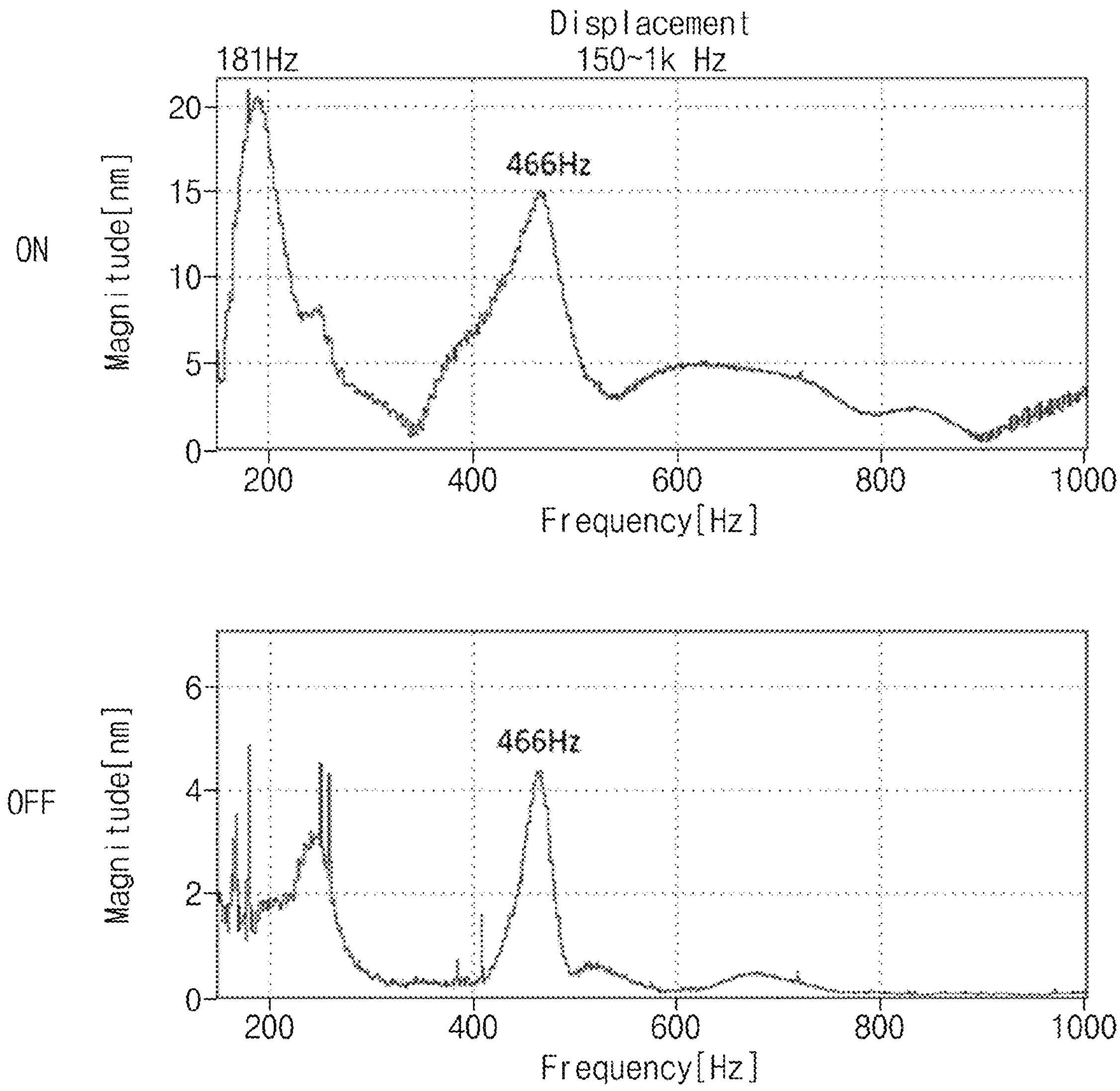

Referring to FIG. 12B, the resonant frequency of the left vibrator (On) is about 181 Hz and about 466 Hz, and one of the resonant frequencies of the right vibrator (Off) is about 466 Hz. At this time, the vibration displacement of the left vibrator (On) is greater than the vibration displacement of the right vibrator (Off). In addition, the left vibrator (On) has a very large vibration displacement (there is not much difference from the resonant frequency of LRA (about 240 Hz)) around 200 Hz where humans may easily feel the vibration. This is a result showing that the vibration interference between the vibration elements VMS and the first substrate 100 and/or the second substrate 160 and the vibration interference between the vibration elements VMS are very small.

The results of FIGS. 9A, 9B, 10A, 10B, 11A, 11B, 12A, and 12B are summarized in Table 2 below. At this time, the vibration displacement of the left vibrator (On) and the right vibrator (Off) is the result measured at the resonant frequency where the vibration displacement of the left vibrator (On) is the largest. At this time, $R_{on/off}$ represents the ratio of the vibration displacement of the left vibrator to the vibration displacement of the right vibrator.

TABLE 2

| FIGS. | Vibration displacement of left vibrator (nm) | Vibration displacement of right vibrator (nm) | Vibration frequency (Hz) | $R_{on/off}$ |
|---|---|---|---|---|
| 9a, 9b | 5.7 | 3.0 | 240 | 1.9 |
| 10a, 10b | 43 | 17 | 175 | 2.5 |
| 11a, 11b | 47.7 | 2.4 | 468 | 19.8 |

As the vibration displacement of the left vibrator (On) with voltage applied is greater than the vibration displacement of the right vibrator (Off) without voltage, and the magnitude of the vibration displacement of the left vibrator (On) is greater, vibration interference may be well attenuated. That is, in the case of FIGS. 11A and 11B and the case of FIGS. 12A and 12B, vibration interference may be more attenuated. In other words, when a vibration element VMS including the vibrator 131 is provided, vibration interference between the vibration elements VMS and the first substrate 100 and/or the second substrate 160 and vibration interference between the vibration elements VMS may be more attenuated.

FIGS. 13A, 14A, 15A, and 16A are cross-sectional views illustrating vibratory stimulation devices according to embodiments of the inventive concept. FIGS. 13B, 14B, 15B and 16B are graphs showing vibration displacement spectra when voltage is applied to vibration elements of the vibratory stimulation devices of FIGS. 9A to 12A, respectively.

More specifically, FIGS. 13B to 16B are graphs measuring vibration displacement spectra from about 80 Hz to about 1 kHz in 1.25 Hz units using a laser vibrometer with DC voltage of about 2.4 V applied only to the left vibrator. In this case, the measured vibration displacement may be a relative value set as the reference point to the surface of the vibrator 132. The unit of the measured vibration displacement is nm (or μm).

In FIGS. 13A to 16A and 13B to 16B, each of the vibrators 132 may be an eccentric rotating mass (ERM). The interval of the vibrators 132 may be about 25 mm, and each of the vibrators 132 may have a thickness of about 2.5 mm and a diameter of about 5 mm.

Figure 13A:
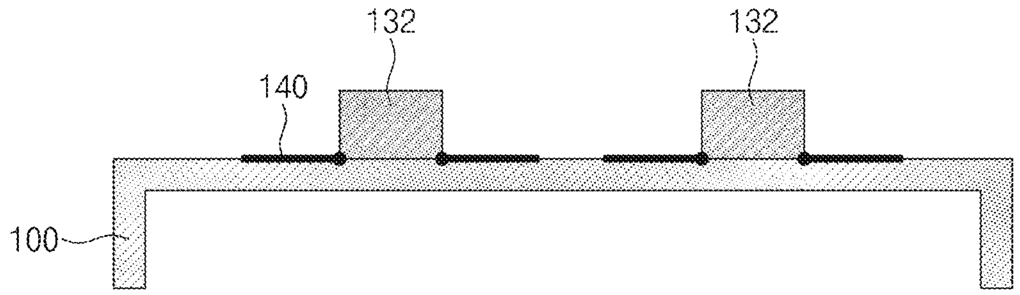

Referring to FIG. 13A, a pair of vibrators 132 connected to the electrode wire 140 may be provided on the first substrate 100. The first substrate 100 may be a rigid disk-shaped plastic substrate. The first substrate 100 may have a diameter of about 147 mm.

Figure 13B:
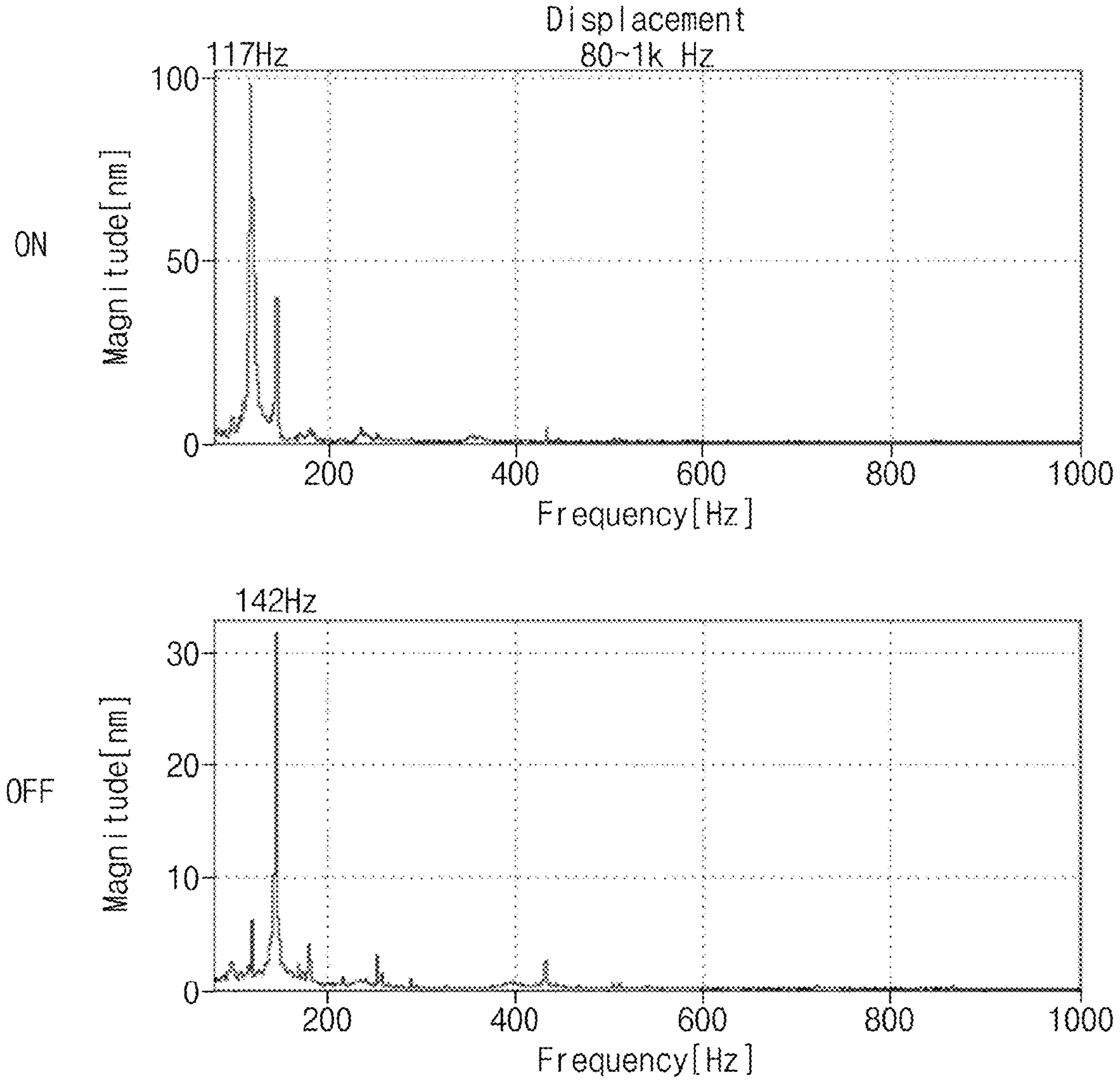

Referring to FIG. 13B, the resonant frequency of the left vibrator (On) is about 117 Hz, and the resonant frequency of the right vibrator (Off) is about 142 Hz. The vibration displacement spectrum of each of the left vibrator (On) and the right vibrator (Off) is not large, and the vibration displacement is relatively small compared to other cases. This is a result showing that vibration interference is very large because the vibration of the left vibrator (On) is transmitted to the right vibrator (Off) through the first substrate 100.

Figure 14A:
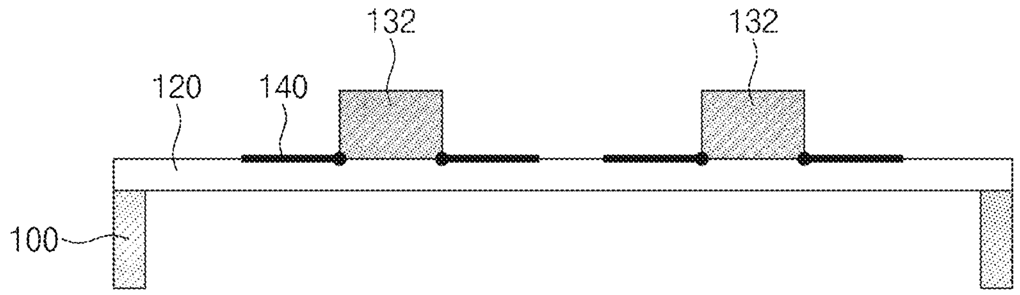

Referring to FIG. 14A, a vibration film 120 may be provided on the first substrate 100, and a pair of vibrators 132 connected to the electrode wire 140 may be provided on the vibration film 120. The first substrate 100 may be a box-shaped hard plastic substrate. The first substrate 100 may have a width of about 62 mm and a length of about 97 mm. The vibration film 120 may include PDMS. The vibration film 120 may have a width of about 62 mm, a length of about 47 mm, and a thickness of about 300 μm.

Figure 14B:
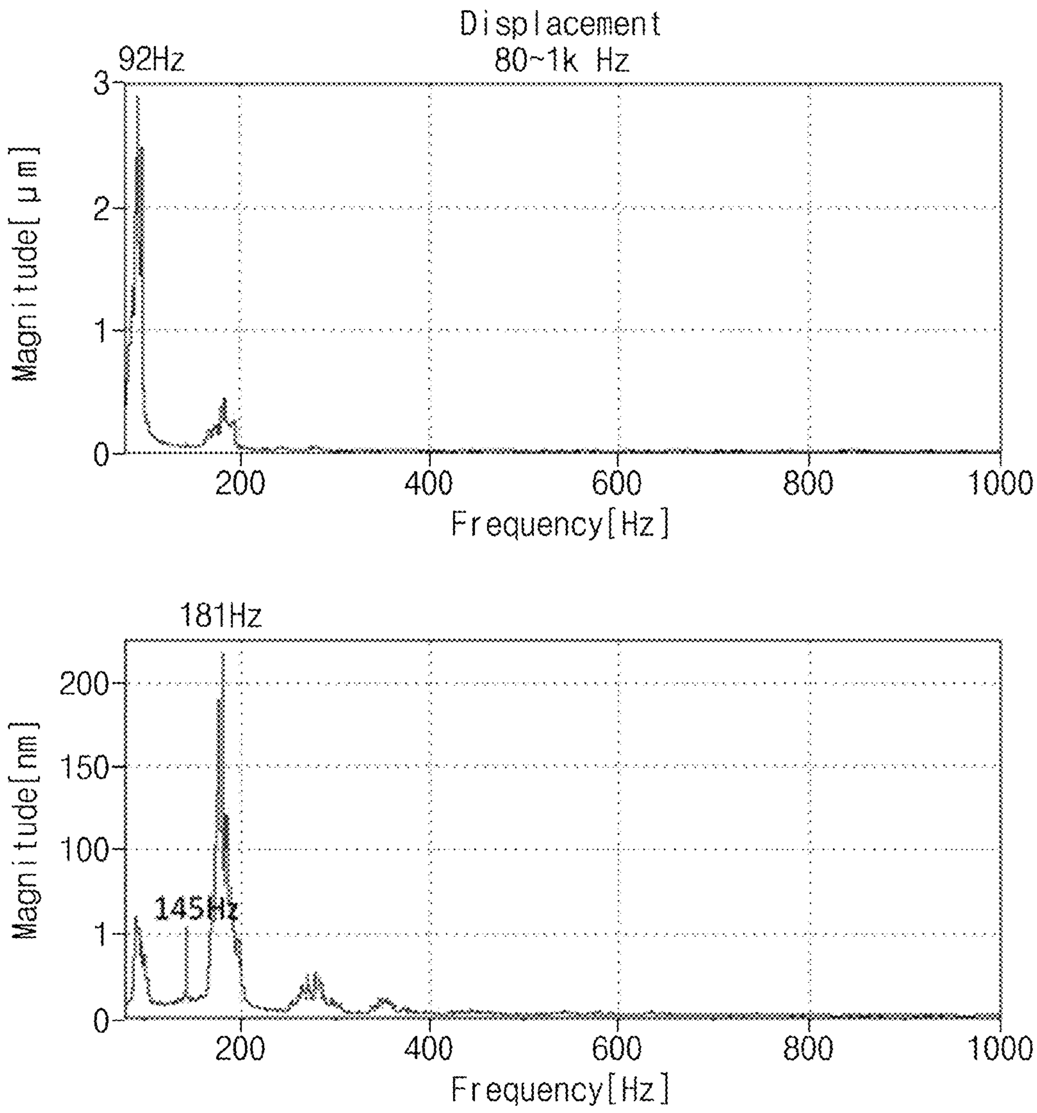

Referring to FIG. 14B, one of the resonant frequencies of the left vibrator (On) is about 92 Hz, and the resonant frequency of the right vibrator (Off) is about 145 Hz and about 181 Hz. The vibration displacement of FIG. 14B is greater than that of FIG. 13B. The ratio of the largest vibration displacement is that the left vibrator (On) is higher than the right vibrator (Off). This is a result showing that there is vibration interference between the vibrators 132 connected by the vibration film 120. However, the vibration interference between the vibrators 132 connected by the vibration film 120 is smaller than that of FIG. 13B.

Figure 15A:
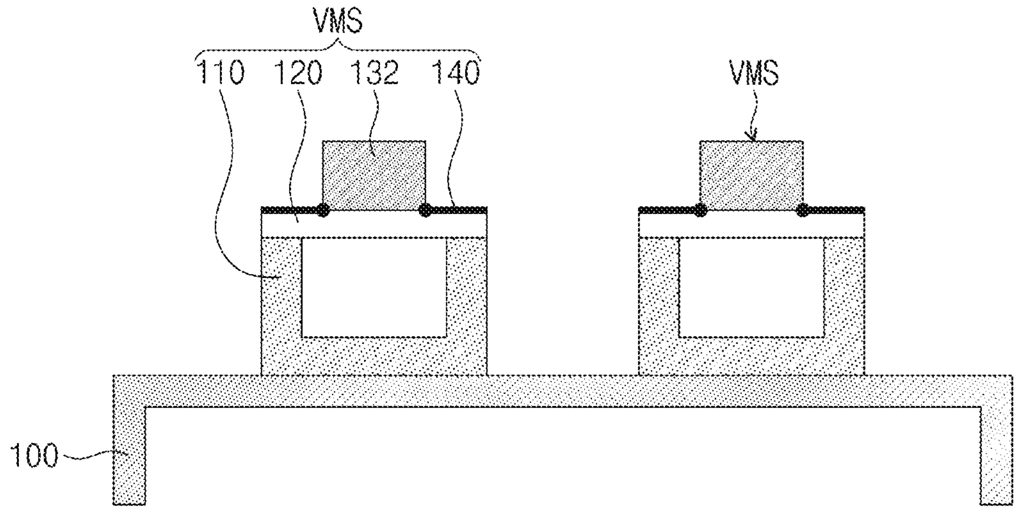

Referring to FIG. 15A, a pair of vibration elements VMS may be provided on the first substrate 100. Each of the vibration elements VMS may include a stand 110, a vibration film 120 on the stand 110, and a vibrator 132 connected to the electrode wire 140 on the vibration film 120.

The first substrate 100 may be a rigid disk-shaped plastic substrate. The first substrate 100 may have a diameter of about 147 mm. The stand 110 may include a cured resin. The stand 110 may have a height of about 5 mm and a diameter of about 20 mm. The vibration film 120 may include PDMS. The vibration film 120 may have a thickness of about 0.3 mm.

Figure 15B:
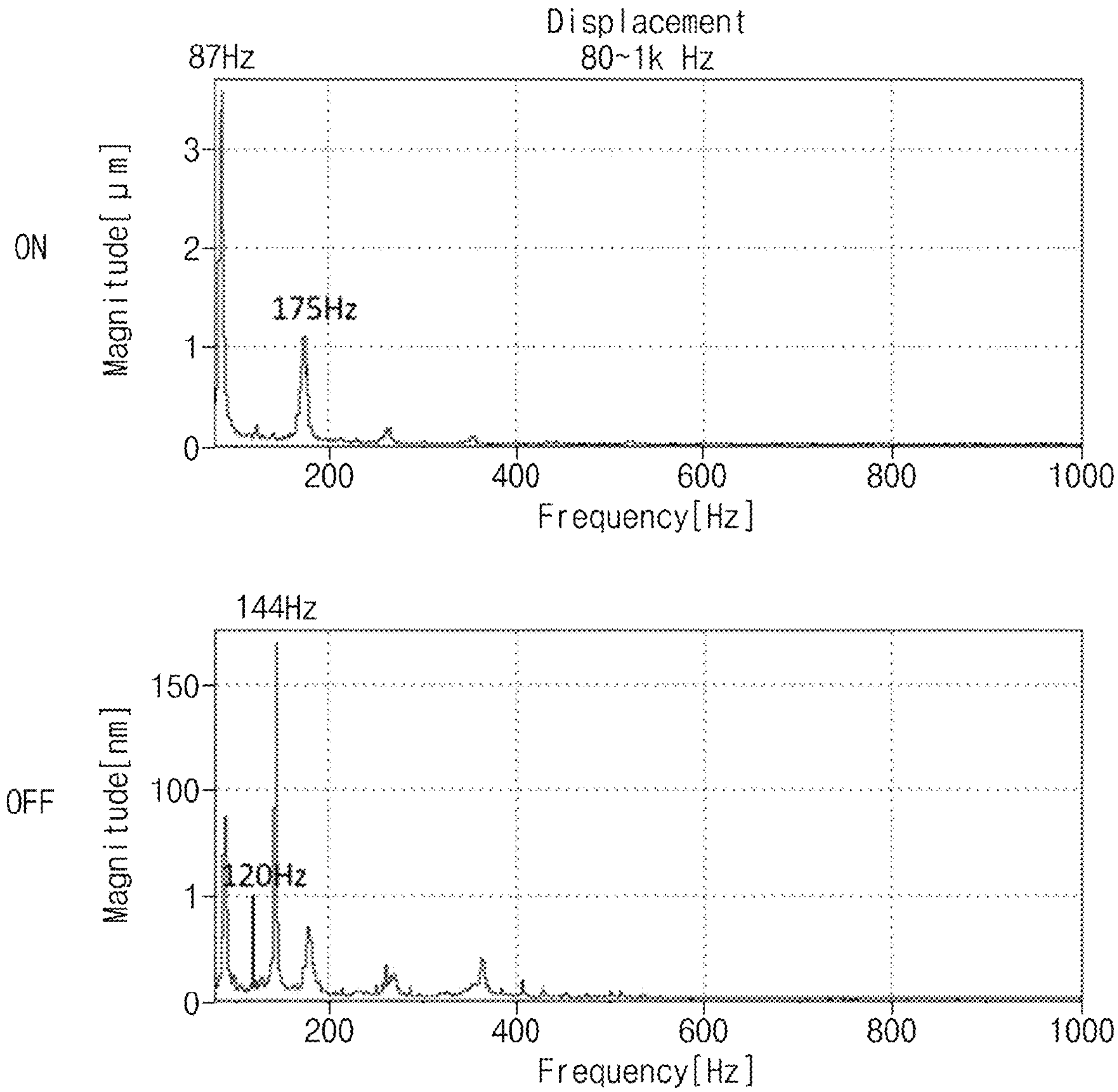

Referring to FIG. 15B, the resonant frequencies of the left vibrator (On) are about 87 Hz and about 175 Hz, and the resonant frequencies of the right vibrator (Off) are about 120 Hz and about 144 Hz. At this time, the vibration displacement of the left vibrator (On) is greater than the vibration displacement of the right vibrator (Off). This is a result showing that the vibration interference between the vibration elements VMS and the first substrate 100 and the vibration interference between the vibration elements VMS are very small.

Figure 16A:
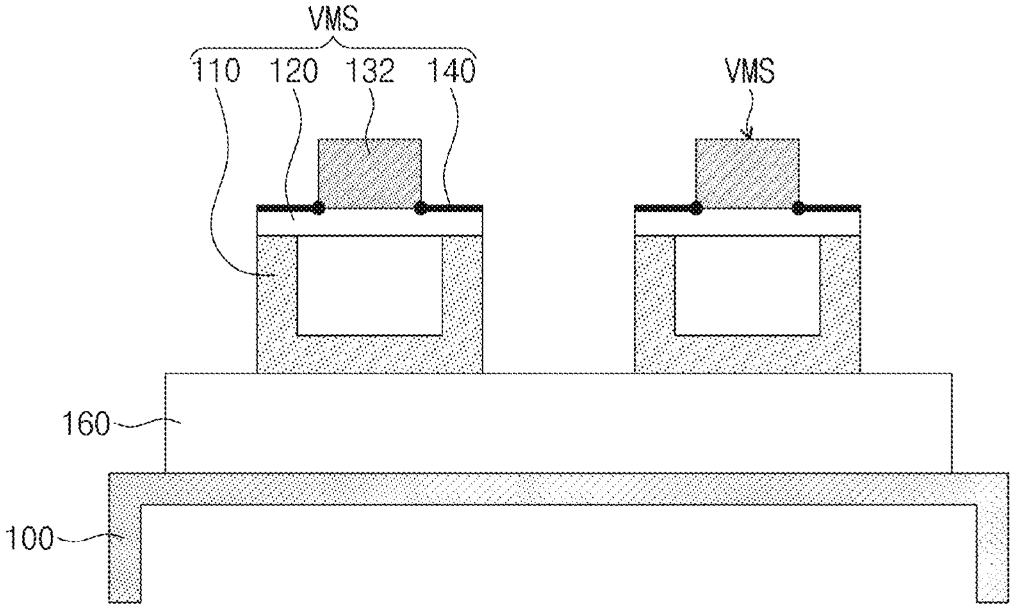

Referring to FIG. 16A, a second substrate 160 may be provided on the first substrate 100, and a pair of vibration elements VMS may be provided on the second substrate 160. Each of the vibration elements VMS may include a stand 110, a vibration film 120 on the stand 110, and a vibrator 132 connected to the electrode wire 140 on the vibration film 120.

The first substrate 100 may be a rigid disk-shaped plastic substrate. The first substrate 100 may have a diameter of about 147 mm. The second substrate 160 may include polyurethane. The second substrate 160 may have a thickness of about 2 mm. The stand 110 may include a cured resin. The stand 110 may have a height of about 5 mm and a diameter of about 20 mm. The vibration film 120 may include PDMS. The vibration film 120 may have a thickness of about 0.3 mm.

Figure 16B:
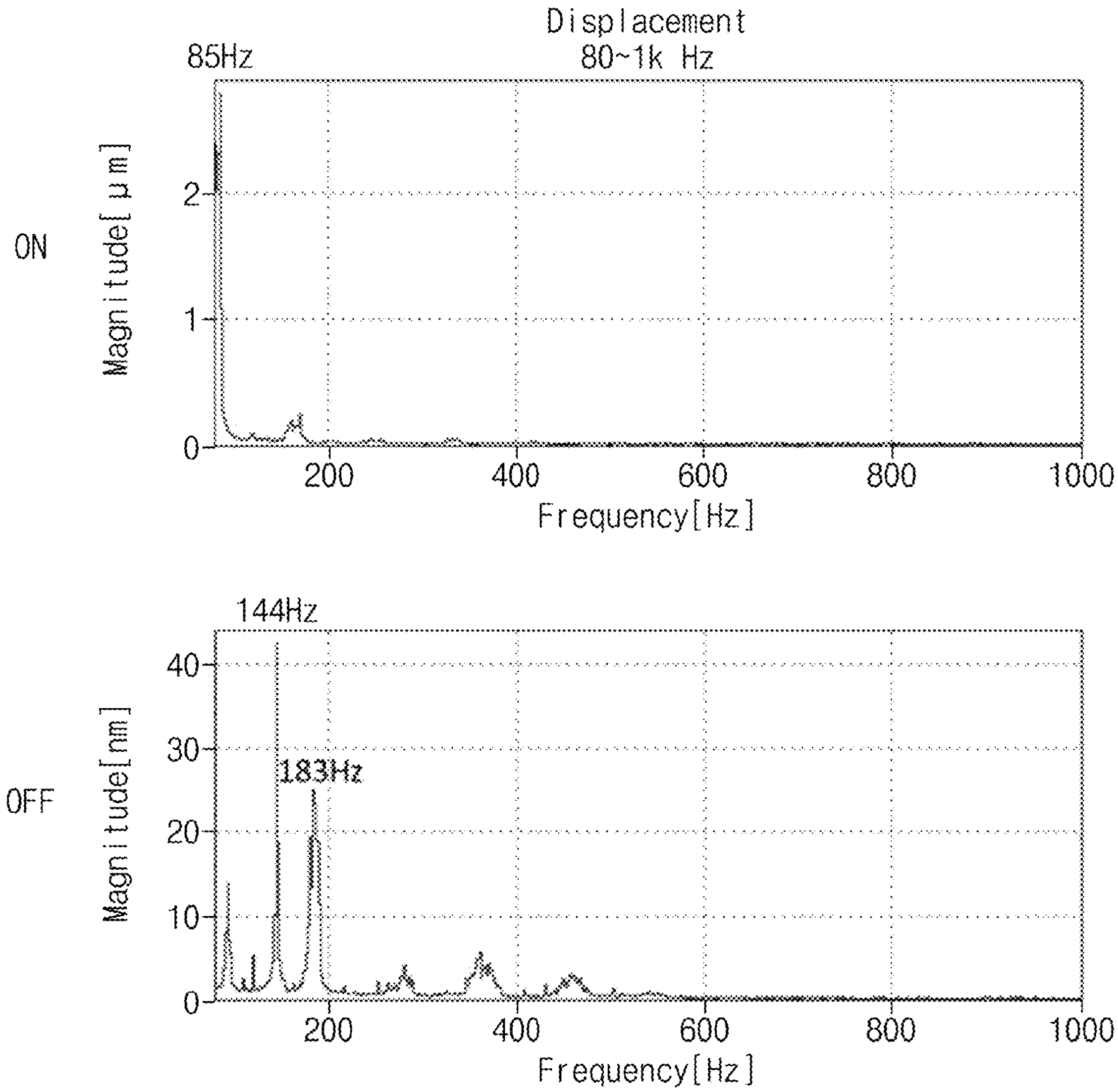

Referring to FIG. 16B, the resonant frequency of the left vibrator (On) is about 85 Hz, and the resonant frequency of the right vibrator (Off) is about 144 Hz and about 183 Hz. At this time, the vibration displacement of the left vibrator (On) is greater than the vibration displacement of the right vibrator (Off). This is a result showing that the vibration interference between the vibration elements VMS and the first substrate 100 and/or the second substrate 160 and the vibration interference between the vibration elements VMS are very small.

The results of FIGS. 13A, 13B, 14A, 14B, 15A, 15B, 16A and 16B are summarized in Table 3 below. At this time, the vibration displacement of the left vibrator (On) and the right vibrator (Off) is the result measured at the resonant frequency. At this time, $R_{on/off}$ represents the ratio of the vibration displacement of the left vibrator to the vibration displacement of the right vibrator.

TABLE 3

| FIGS. | Vibration displacement of left vibrator (nm) @ frequency (Hz) | Vibration displacement of right vibrator (nm) @ frequency (Hz) | $R_{on/off}$ |
|---|---|---|---|
| 13a, 13b | 98 @ 117 | 32 @ 142 | 3 |
| 14a, 14b | 2918 @ 92 | 220 @ 181 | 13 |
| 15a, 15b | 3594 @ 87 | 34 @ 144 | 106 |
| 16a, 16b | 2811 @ 85 | 43 @ 144 | 65 |

As the vibration displacement of the left vibrator (On) with voltage applied is greater than the vibration displacement of the right vibrator (Off) without voltage, and the magnitude of the vibration displacement of the left vibrator (On) is greater, vibration interference may be well attenuated. That is, in the case of FIGS. 15A and 15B and the case of FIGS. 16A and 16B, vibration interference may be more attenuated. In other words, when a vibration element VMS including the vibrator 132 is provided, vibration interference between the vibration elements VMS and the first substrate 100 and/or the second substrate 160 and vibration interference between the vibration elements VMS may be more attenuated.

Figure 17:
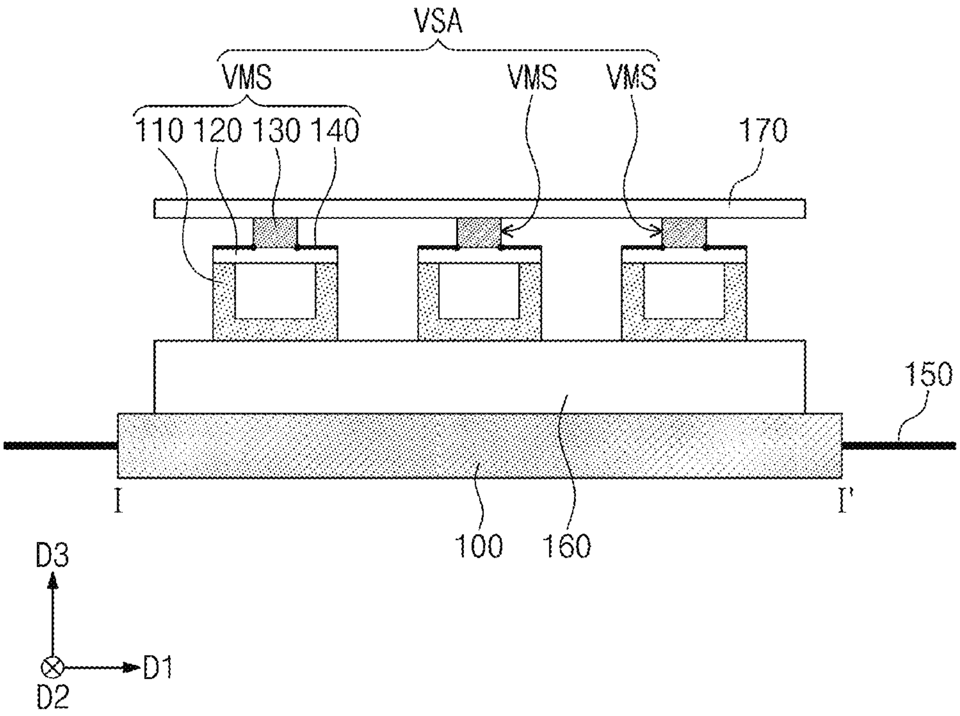
FIGS. 17 to 26 are cross-sectional views for explaining vibratory stimulation devices according to embodiments of the inventive concept, and correspond to cross-sections taken along the line I-I' in FIGS. 1A and 2A, respectively.

FIG. 17 is a cross-sectional view illustrating a vibratory stimulation device according to embodiments of the inventive concept, and corresponds to a cross-sectional view of FIG. 2A taken along the line I-I'. For convenience of description, descriptions of substantially the same matters as those described with reference to FIGS. 1A to 1E, 2A, and 2B will be omitted, and differences will be described in detail.

Referring to FIG. 17, the vibratory stimulation device according to the inventive concept may further include a protective film 170 on a vibration element array VSA. The protective film 170 may contact the upper surface of the vibrator 130 of each of the vibration elements VMS. The protective film 170 may have various shapes, sizes, and forms according to the body part to which vibration stimulation is to be transmitted. The protective film 170 may have, for example, a mask pack form. The protective film 170 may include, for example, a flexible and stretchable soft material such as PDMS, PMMA, elastomer, silicone, urethane, rubber, polyacrylic, stretchable fiber, tape, or sponge. In addition, the protective film 170 may further include a moisture gel and a nutritional component. The protective film 170 may physically, chemically, biologically and electrically separate the body part to transmit vibration stimulation, the vibrator 130 and the electrode wire 140, and the like. The protective film 170 not only serves as a medium so that vibration stimulation may be better transmitted to the body part, but also supplies moisture and nutrients to the body part.

Figure 18:
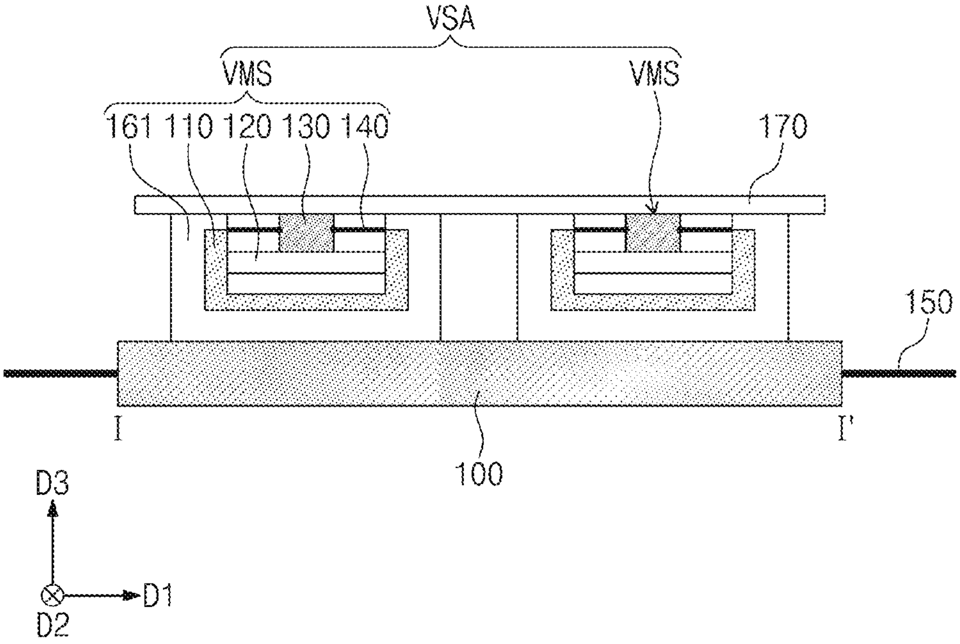

FIG. 18 is a cross-sectional view illustrating a vibratory stimulation device according to embodiments of the inventive concept, and corresponds to a cross-sectional view of FIG. 2A taken along the line I-I'. For convenience of description, descriptions of substantially the same matters as those described with reference to FIGS. 1A to 1E, 2A, 2B, and 17 will be omitted, and differences will be described in detail.

Referring to FIG. 18, second substrates 161 provided on the first substrate 100 may be arranged along a first direction D1 and may be spaced apart from each other in a first direction D1. Each of the second substrates 161 may include, for example, a flexible and stretchable soft material such as PDMS, PMMA, elastomer, silicone, urethane, rubber, polyacrylic, stretchable fiber, tape, or sponge. Each of the second substrates 161 may have a cylindrical or polygonal column shape with an open top.

Hereinafter, for convenience of explanation, a singular vibration element VMS and a singular second substrate 161 will be described, but the following description may be equally applied to other vibration elements VMS and other second substrates 161. The vibration element VMS may include a second substrate 161, a stand 110, a vibration film 120, a vibrator 130, and an electrode wire 140.

The stand 110, the vibration film 120, the vibrator 130, and the electrode wire 140 may be provided inside a space surrounded by an upper surface and an inner wall of the second substrate 161. The inner wall of the stand 110 may be aligned with a part of the inner wall of the second substrate 161 in the third direction D3. The vibration film 120, the vibrator 130, and the electrode wire 140 may be provided inside the space surrounded by the upper surface and the inner wall of the stand 110. That is, the upper surface of the vibration film 120 may be located at a lower level than the uppermost surface of the stand 110. The lower surface of the vibrator 130 may contact the upper surface of the vibration film 120. The upper surface of the vibrator 130 may be positioned at a higher level than the uppermost surface of the stand 110 and may be substantially coplanar with the uppermost surface of the second substrate 161. The electrode wire 140 may extend in the first direction D1 between the vibrator 130 and the second substrate 161 or the stand 110. The protective film 170 provided on the vibration element array VSA may contact the upper surface of the vibrator 130 and the upper surface of the second substrate 161.

Figure 19:
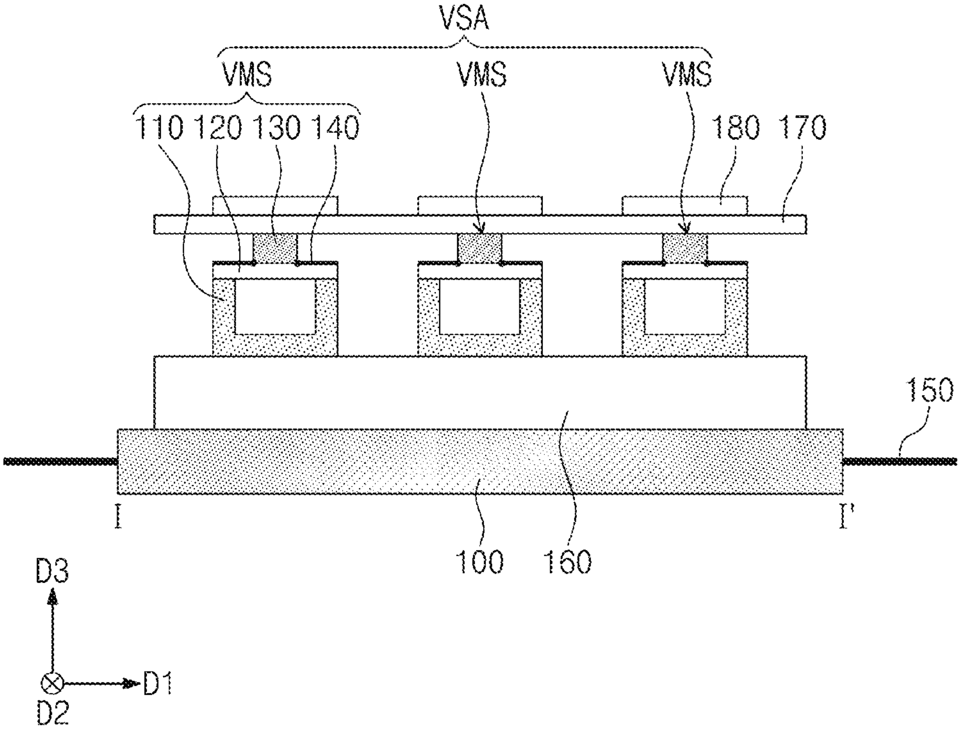

FIG. 19 is a cross-sectional view illustrating a vibratory stimulation device according to embodiments of the inventive concept, and corresponds to a cross-sectional view of FIG. 2A taken along the line I-I'. For convenience of description, descriptions of substantially the same matters as those described with reference to FIGS. 1A to 1E, 2A, 2B, and 17 will be omitted, and differences will be described in detail.

Referring to FIG. 19, the vibratory stimulation device according to the inventive concept may further include contact pads 180 on the protective film 170. The contact pads 180 may include, for example, a flexible and stretchable soft material such as PDMS, PMMA, elastomer, silicone, urethane, rubber, polyacrylic, stretchable fiber, tape, or sponge. In addition, the contact pads 180 may further include a moisture gel and a nutritional component. Each of the contact pads 180 may be provided at a position overlapping each of the vibration elements VMS in the third direction D3.

The contact pads 180 not only serve as a medium so that vibration stimulation may be better transmitted to the body part, but also supplies moisture and nutrients to the body part. In addition, the contact pads 180 may prevent or minimize vibration stimulation from being evenly absorbed in the entire body region, and provide partial vibration stimulation to a partial region of the body region.

Figure 20:
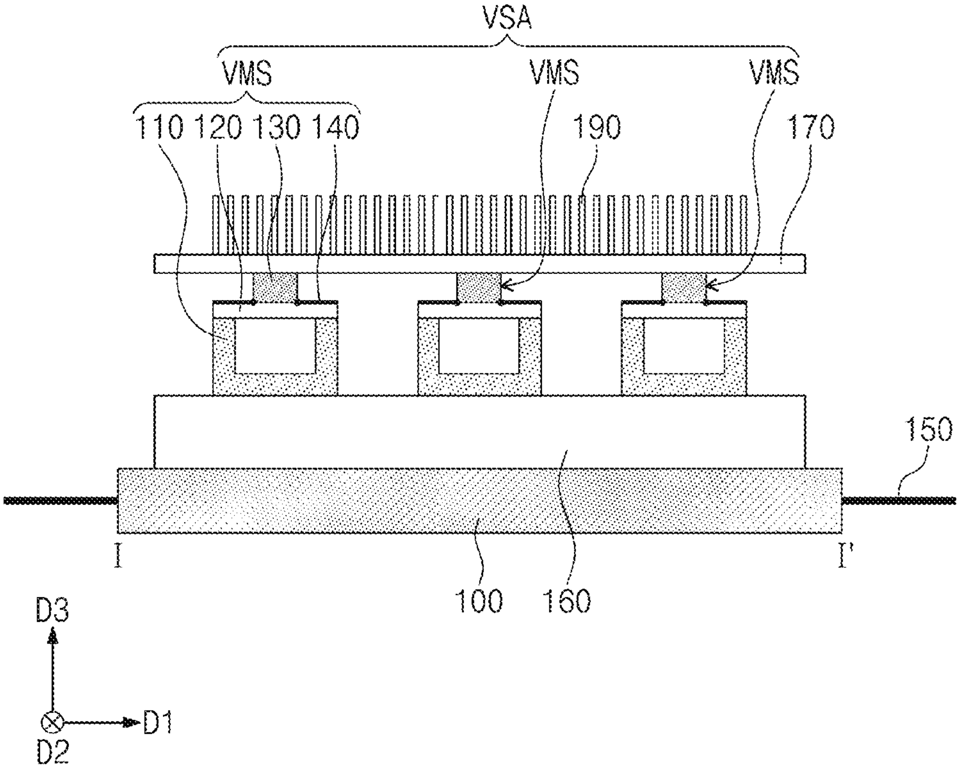

FIG. 20 is a cross-sectional view illustrating a vibratory stimulation device according to embodiments of the inventive concept, and corresponds to a cross-sectional view of FIG. 2A taken along the line I-I'. For convenience of description, descriptions of substantially the same matters as those described with reference to FIGS. 1A to 1E, 2A, 2B, and 17 will be omitted, and differences will be described in detail.

Referring to FIG. 20, the vibratory stimulation device according to the inventive concept may further include ciliated pads 190 on the protective film 170. The ciliated pads 190 may have a fine brush or hair shape. In addition, the ciliated pads 190 may further include a moisture gel and a nutritional component. One end of each of the ciliated pads 190 may be fixed to the upper surface of the protective film 170, and the other end may be freely shaken or bent. The ciliated pads 190 not only serve as a medium so that vibration stimulation may be better transmitted to the body part, but also supplies moisture and nutrients to the body part.

Figure 21:
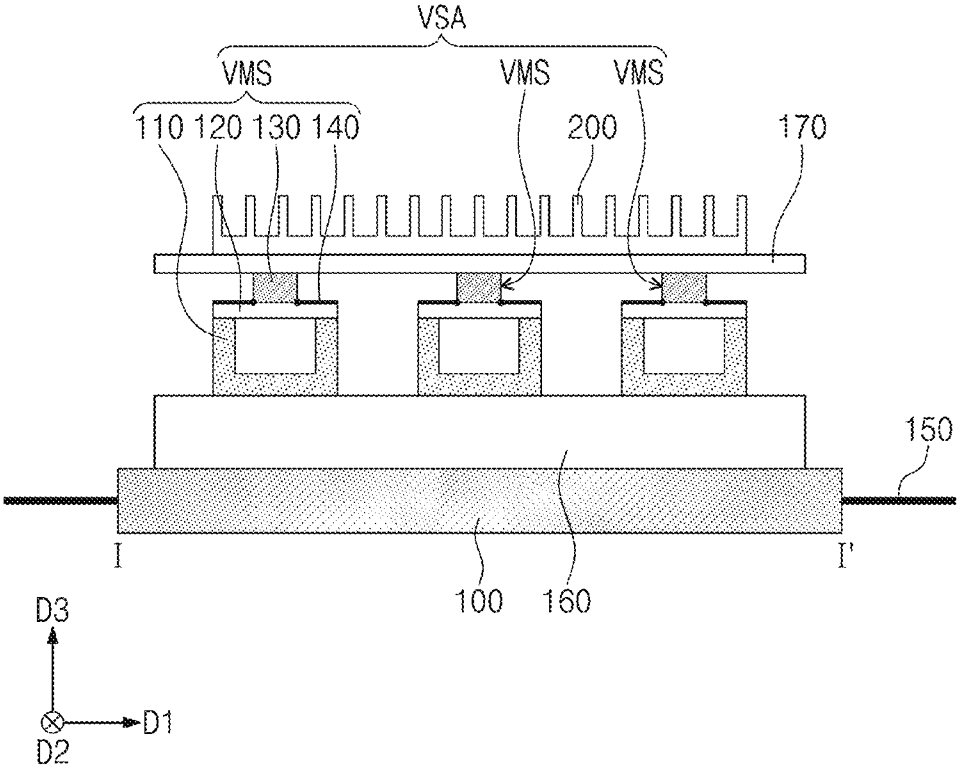

FIG. 21 is a cross-sectional view illustrating a vibratory stimulation device according to embodiments of the inventive concept, and corresponds to a cross-sectional view of FIG. 2A taken along the line I-I'. For convenience of description, descriptions of substantially the same matters as those described with reference to FIGS. 1A to 1E, 2A, 2B, and 17 will be omitted, and differences will be described in detail.

Referring to FIG. 21, the vibratory stimulation device according to the inventive concept may further include a protruding contact pad 200 on a protective film 170. The protruding contact pad 200 may include a flat pad portion and protrusion portions protruding from the pad portion. The density of the protruding portions of the protruding contact pad 200 may be smaller than the density of the ciliated pads 190 described with reference to FIG. 20.

The protruding contact pad 200 may include a soft material that is flexible and stretchable, or may include a hard and rigid material, depending on embodiments. In addition, the protruding contact pad 200 may further include a moisture gel and a nutritional component. The composition of the protruding contact pad 200 may vary depending on the shape and position of the body part to which vibration stimulation is to be transmitted. For example, when a vibration stimulation is to be delivered to the scalp, a protruding contact pad 200 including a hard and hard material may be used in consideration of hair and the like.

The protruding contact pad 200 not only serves as a medium so that vibration stimulation may be better transmitted to the body part, but also supplies moisture and nutrients to the body part. In addition, the protruding contact pad 200 may prevent or minimize vibration stimulation from being evenly absorbed in the entire body region, and provide partial vibration stimulation to a partial region of the body region.

Figure 22:
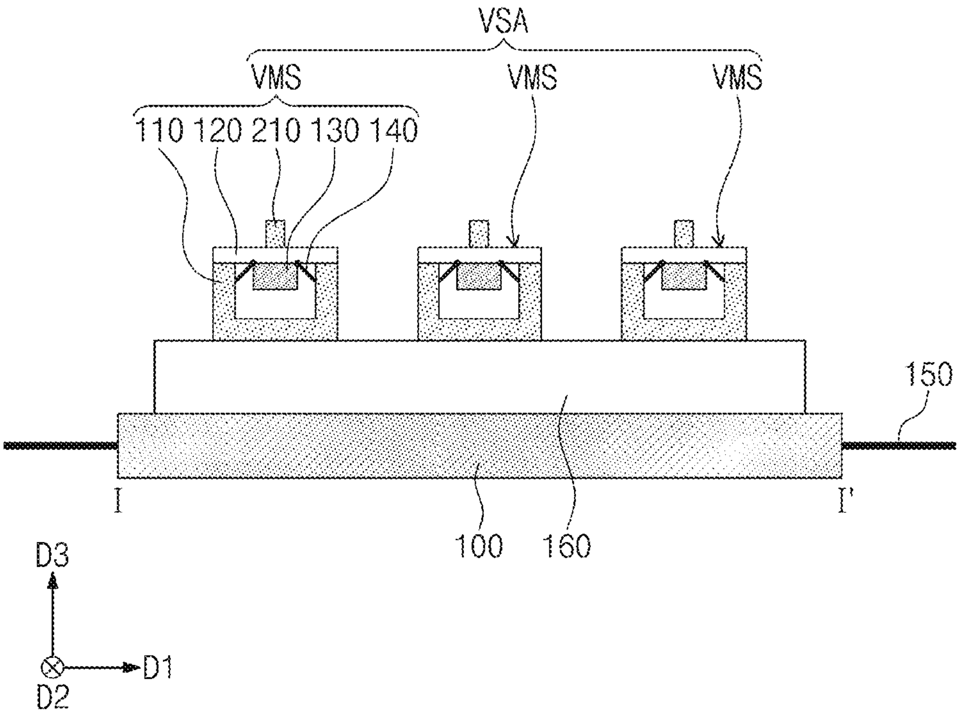

FIG. 22 is a cross-sectional view illustrating a vibratory stimulation device according to embodiments of the inventive concept, and corresponds to a cross-sectional view of FIG. 2A taken along the line I-I'. For convenience of description, descriptions of substantially the same matters as those described with reference to FIGS. 1A to 1E, 2A, and 2B will be omitted, and differences will be described in detail.

Referring to FIG. 22, in each of the vibration elements VMS, the vibrator 130 may be provided on the lower surface of the vibration film 120. The vibrator 130 may adhere to or contact the lower surface of the vibration film 120. The electrode wire 140 may be provided between the stand 110 and the vibrator 130. The electrode wire 140 may be provided in a space surrounded by a lower surface of the vibration film 120 and an upper surface and an inner wall of the stand 110, and may be protected from external impact and/or contamination because it is not exposed to the outside.

Each of the vibration elements VMS of the vibratory stimulation device according to the inventive concept may further include a protruding structure 210 on the upper surface of the vibration film 120. The protruding structure 210 may transmit the vibration of the vibrator 130 to the skin or the like. The protruding structure 210 may include a soft material that is flexible and stretchable, or may include a hard and rigid material, depending on embodiments. The composition of the protruding structure 210 may vary depending on the shape and position of the body part to which vibration stimulation is to be transmitted. For example, when a vibration stimulation is to be delivered to the scalp, the protruding structure 210 including a hard and hard material may be used in consideration of hair and the like.

Figure 23:
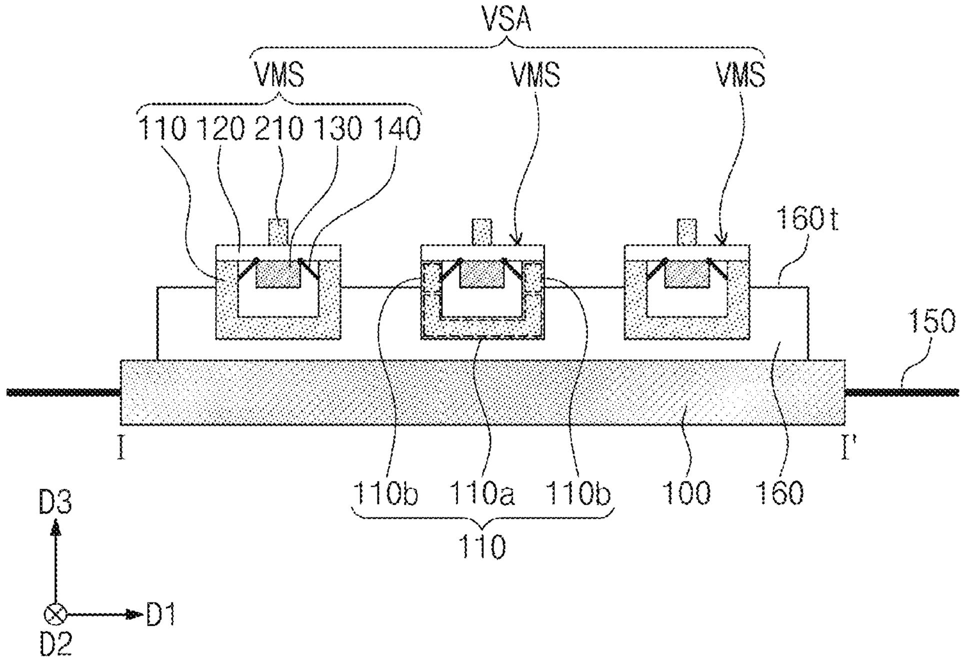

FIG. 23 is a cross-sectional view illustrating a vibratory stimulation device according to embodiments of the inventive concept, and corresponds to a cross-sectional view of FIG. 2A taken along the line I-I'. For convenience of description, descriptions of substantially the same matters as those described with reference to FIGS. 1A to 1E, 2A, 2B, and 22 will be omitted, and differences will be described in detail.

Referring to FIG. 23, at least a portion of the vibration element VMS may be embedded into the second substrate 160. More specifically, at least a portion of the stand 110 of the vibration element VMS may be embedded into the second substrate 160.

The stand 110 includes a first portion 110*a* positioned at a level lower than the upper surface 160*t* of the second substrate 160 and a second portion 110*b* positioned at a level higher than the upper surface 160*t* of the second substrate 160. At least a portion of the vibrator 130 may be located at a level lower than the upper surface 160*t* of the second substrate 160. That is, at least a portion of the vibrator 130 may overlap the second substrate 160 in the first direction D1 and the second direction D2.

Figure 24:
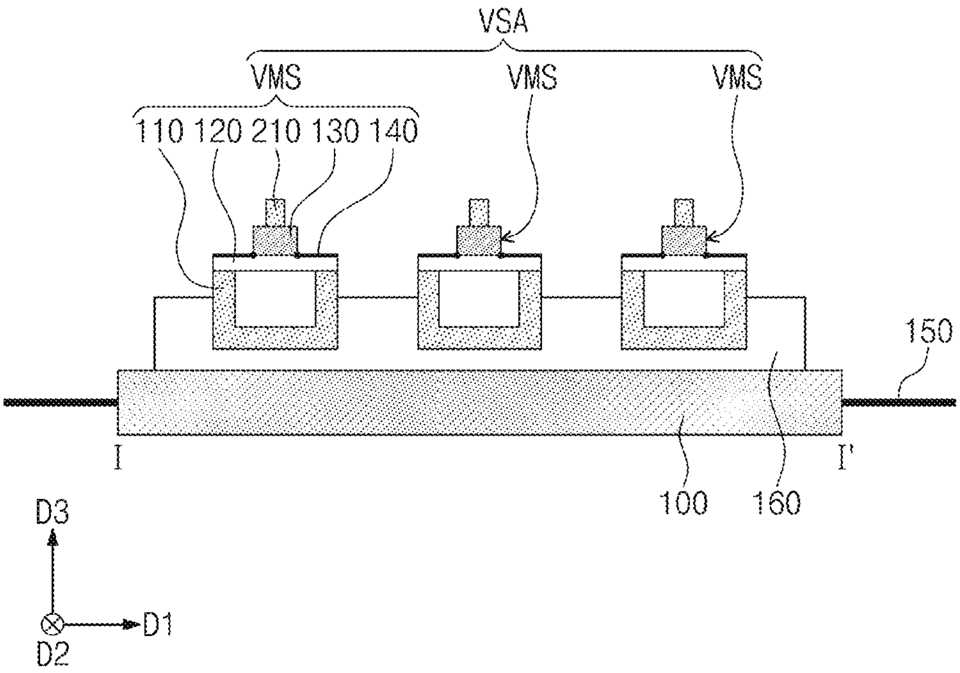

FIG. 24 is a cross-sectional view illustrating a vibratory stimulation device according to embodiments of the inventive concept, and corresponds to a cross-sectional view of FIG. 2A taken along the line I-I'. For convenience of explanation, descriptions of substantially the same matters as those described with reference to FIGS. 1A to 1E, 2A, 2B, 22, and 23 will be omitted, and differences will be described in detail.

Referring to FIG. 24, the vibrator 130 may be provided on the upper surface of the vibration film 120, and the protruding structure 210 may be provided on the upper surface of the vibrator 130.

Figure 25:
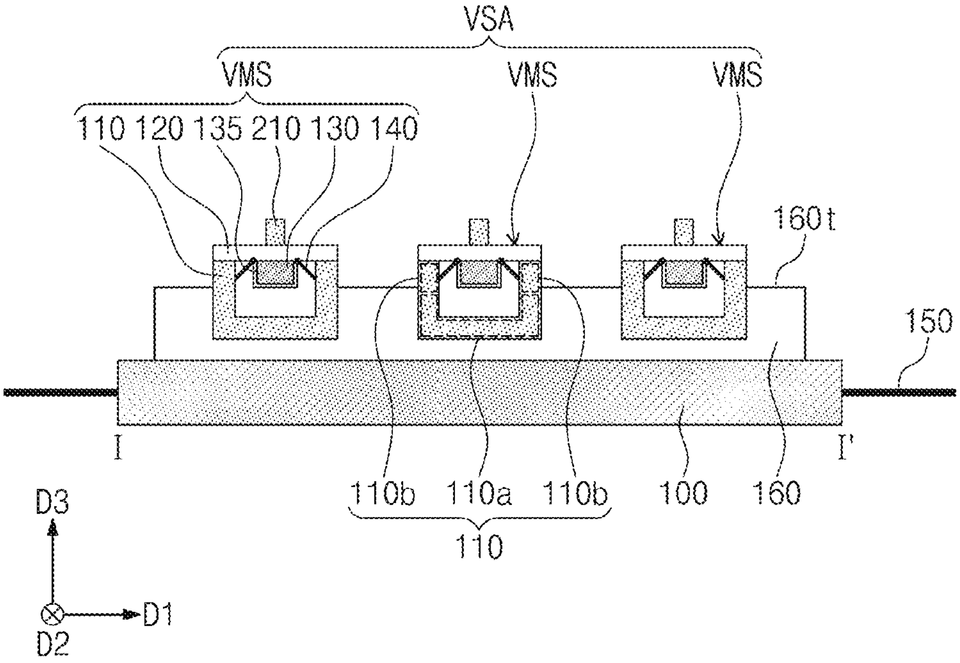

FIG. 25 is a cross-sectional view illustrating a vibratory stimulation device according to embodiments of the inventive concept, and corresponds to a cross-sectional view of FIG. 2A taken along the line I-I'. For convenience of explanation, descriptions of substantially the same matters as those described with reference to FIGS. 1A to 1E, 2A, 2B, 22, and 23 will be omitted, and differences will be described in detail.

Referring to FIG. 25, each of the vibration elements VMS of the vibratory stimulation device according to the inventive concept may further include a vibrator pocket 135 surrounding the vibrator 130. The vibrator pocket 135 may surround the lower surface and sidewalls of the vibrator 130, and may be adhered to the lower surface of the vibration film 120. In other words, the vibrator 130 may be inserted into the vibrator pocket 135. The vibrator pocket 135 may protect the vibrator 130 from external impact and/or contamination.

Figure 26:
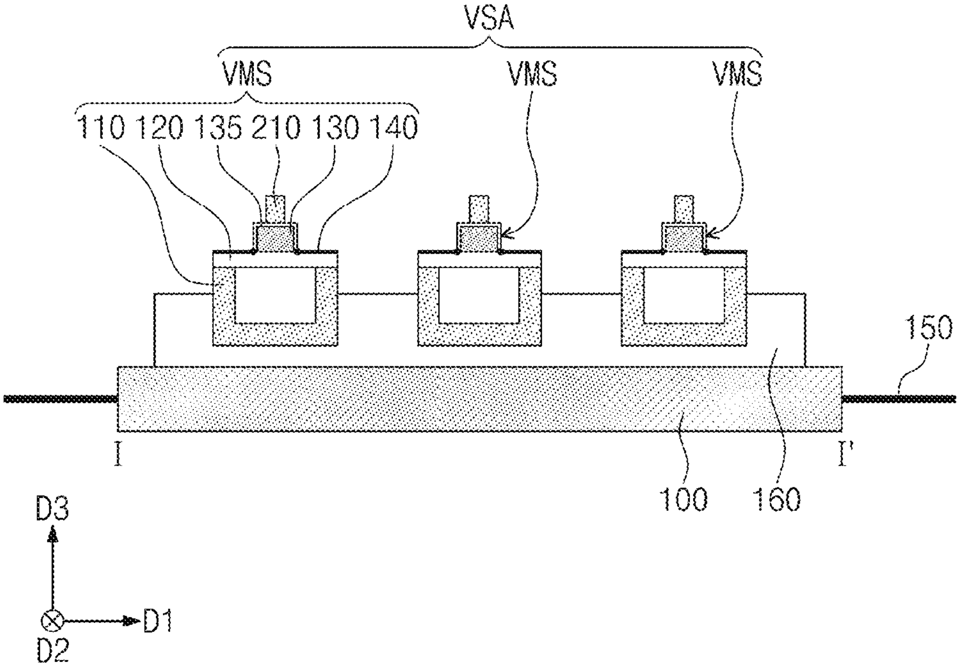

FIG. 26 is a cross-sectional view illustrating a vibratory stimulation device according to embodiments of the inventive concept, and corresponds to a cross-sectional view of FIG. 2A taken along the line I-I'. For convenience of description, descriptions of substantially the same matters as those described with reference to FIGS. 1A to 1E, 2A, 2B, and 25 will be omitted, and differences will be described in detail.

Referring to FIG. 26, the vibrator 130 may be provided on the upper surface of the vibration film 120. The vibrator pocket 135 may surround an upper surface and a sidewall of the vibrator 130 and may be adhered to the upper surface of the vibration film 120. The protruding structure 210 may be provided on the upper surface of the vibrator pocket 135.

Figure 27:
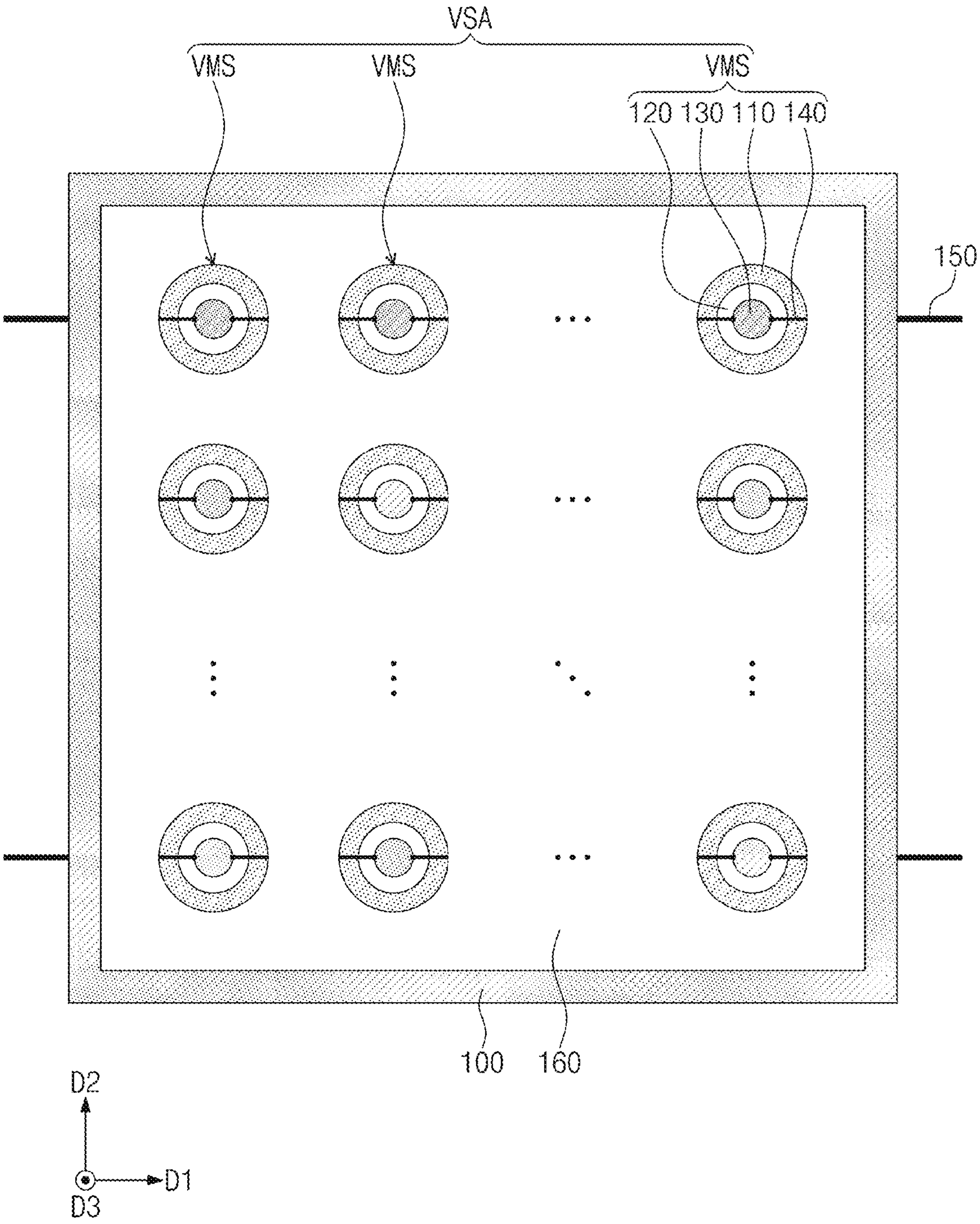
FIG. 27 is a plan view illustrating a vibratory stimulation device according to embodiments of the inventive concept.

FIG. 27 is a plan view illustrating a vibratory stimulation device according to embodiments of the inventive concept. For convenience of description, descriptions of substantially the same matters as those described with reference to FIGS. 1A to 1E, 2A, and 2B will be omitted, and differences will be described in detail.

Referring to FIG. 27, the vibration element array VSA of the vibratory stimulation device according to the inventive concept may include a plurality of vibration elements VMS arranged along a first direction D1 and a second direction D2. That is, the vibration element array VSA may include a plurality of columns arranged along the first direction D1 and a plurality of rows arranged along the second direction D2. The plurality of vibration elements VMS may be spaced apart from each other in the first direction D1 and the second direction D2. However, this is only exemplary, and the inventive concept is not limited thereto, and the number, interval, and arrangement of the vibration elements VMS may vary according to embodiments. For example, the arrangement shape of the vibration elements VMS may have various geometric shapes such as a triangle, a circle, and a honeycomb shape.

The plurality of vibration elements VMS may individually vibrate one by one. In addition, vibration elements VMS corresponding to one row or one column vibrate simultaneously, and vibration elements VMS corresponding to adjacent rows or columns vibrate sequentially with a time difference. In addition, vibration elements VMS adjacent in a diagonal direction (a direction intersecting both the first direction D1 and the second direction D2) or vibration elements VMS grouped in block units may vibrate at the same time.

For example, if trying to deliver vibration stimulation to the scalp, the order of vibrations of the vibration elements VMS may be determined in order to allow blood to flow to a region where hair loss first proceeds. For example, the vibration order may be determined so that the vibration elements VMS at the edges vibrate first, and then the vibration elements VMS at the center vibrate last.

Figure 28:
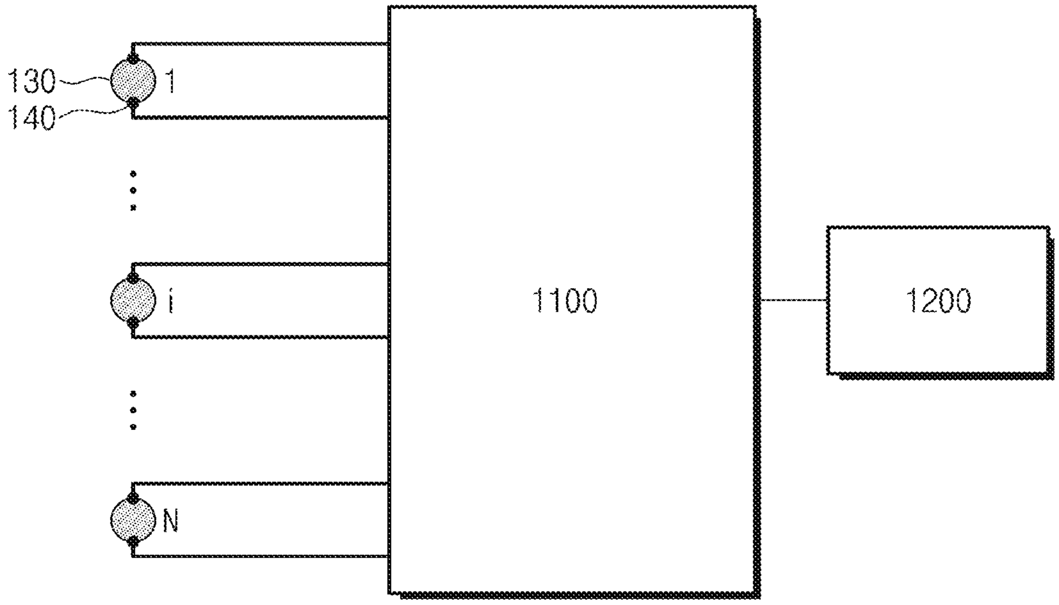
FIG. 28 is a conceptual diagram illustrating a vibratory stimulation system including a vibratory stimulation device according to embodiments of the inventive concept.

FIG. 28 is a conceptual diagram illustrating a vibratory stimulation system including a vibratory stimulation device according to embodiments of the inventive concept.

Referring to FIGS. 27 and 28, a vibratory stimulation system according to the inventive concept may include a vibratory stimulation device, a control unit 1100 individually connected to the vibrator 130 of each of the vibration elements VMS of the vibratory stimulation device through the electrode wire 140, and a power supply unit 1200 electrically connected to the control unit 1100.

The control unit 1100 may include a processor that stores and/or generates an electrical signal that induces vibration stimulation. The control unit 1100 may induce vibration stimulation of each of the vibration elements VMS at the same time, sequentially or in a preprogrammed pattern. The power supply unit 1200 may include a battery that stores and/or supplies electrical energy. The control unit 1100 and the power supply unit 1200 may be provided, for example, inside a vibratory stimulation device. For example, the control unit 1100 and the power supply unit 1200 may be provided inside the first substrate 100 and/or the second substrate 160. As another example, the control unit 1100 and the power supply unit 1200 may be provided outside the vibratory stimulation device.

Figure 29:
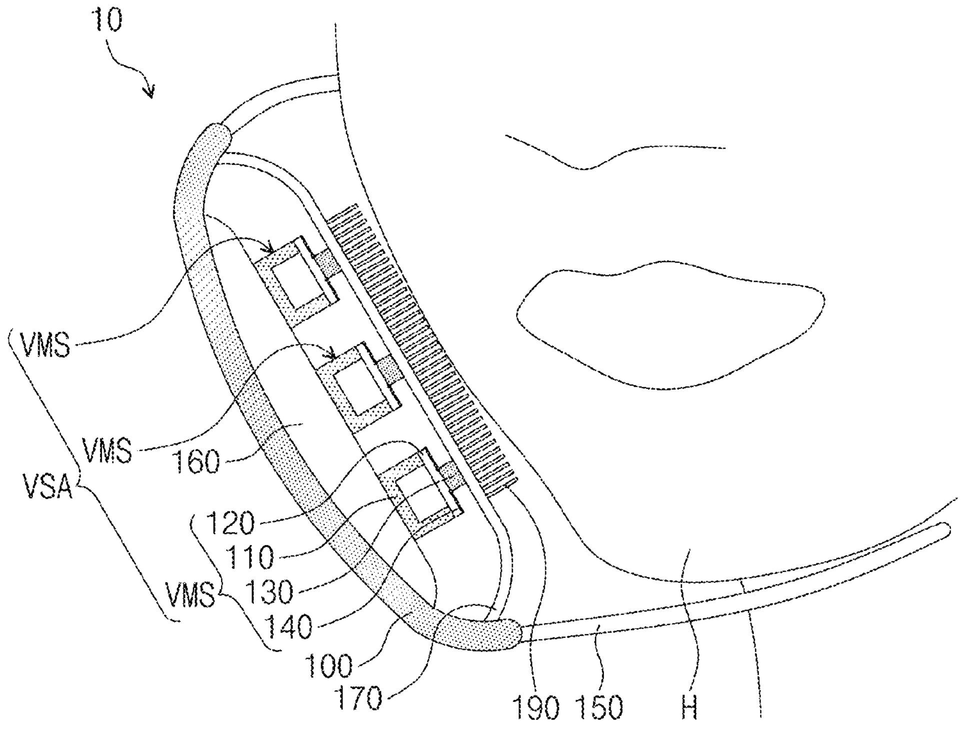
FIGS. 29, 30, and 31 are conceptual diagrams for explaining the use of a vibratory stimulation device according to embodiments of the inventive concept.

FIG. 29 is a conceptual diagram illustrating the use of a vibratory stimulation device according to embodiments of the inventive concept.

Referring to FIG. 29, the vibratory stimulation device 10 according to the inventive concept may be coupled to a human head through a connection band 150. For example, the vibratory stimulation device 10 may have a mask shape and may deliver vibration stimulation to the facial skin. For example, the vibratory stimulation device 10 may include ciliated pads 190 as described with reference to FIG. 20. The second substrate 160 supported by the rigid first substrate 100 may be deformed so that the vibration elements VMS are in close contact with the curvature of the facial skin. The vibratory stimulation device 10 according to the inventive concept may vibrate by dividing each of the vibration elements VMS by location and/or by time, and massage the facial skin by transmitting vibrational and tactile information having a predetermined pattern.

Figure 30:
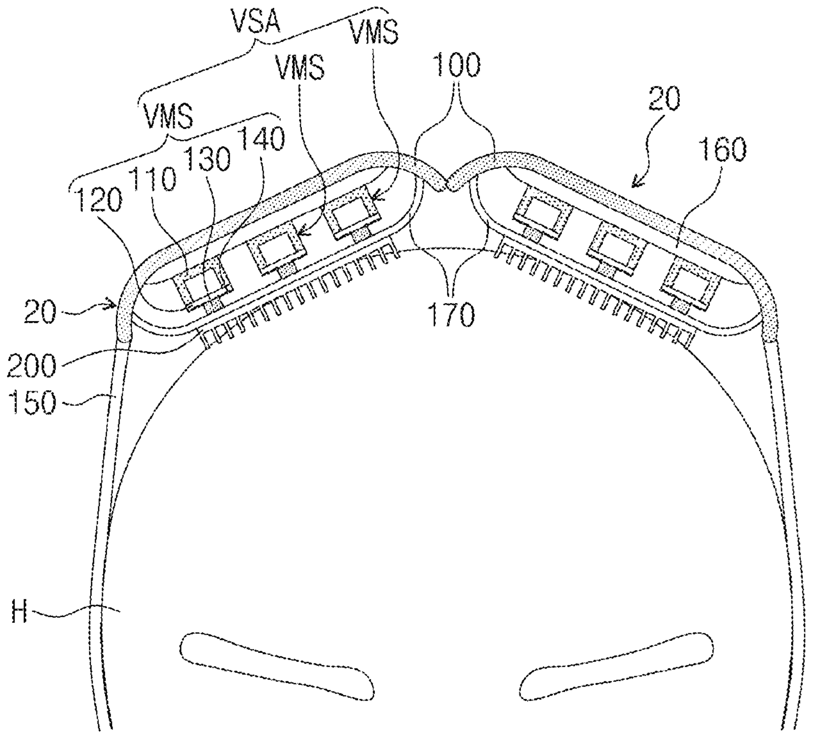

FIG. 30 is a conceptual diagram illustrating the use of a vibratory stimulation device according to embodiments of the inventive concept.

Referring to FIG. 30, a plurality of vibratory stimulation devices 20 according to the inventive concept may be provided. The plurality of vibratory stimulation devices 20 may be connected to each other. For example, the first substrates 100 of the vibratory stimulation devices 20 may be connected to each other. The vibratory stimulation devices 20 may be coupled to the human head through the connection band 150. For example, the vibratory stimulation devices 20 may have a helmet shape, and may deliver vibration stimulation to the scalp. For example, the vibratory stimulation devices 20 may include a protruding contact pad 200 as described with reference to FIG. 21. The second substrate 160 supported by the rigid first substrate 100 may be deformed so that the vibration elements VMS are in close contact with the curvature of the head. The vibratory stimulation device 10 according to the inventive concept may vibrate by dividing each of the vibration elements VMS by location and/or by time, and massage the scalp by transmitting vibrational and tactile information having a predetermined pattern.

Figure 31:
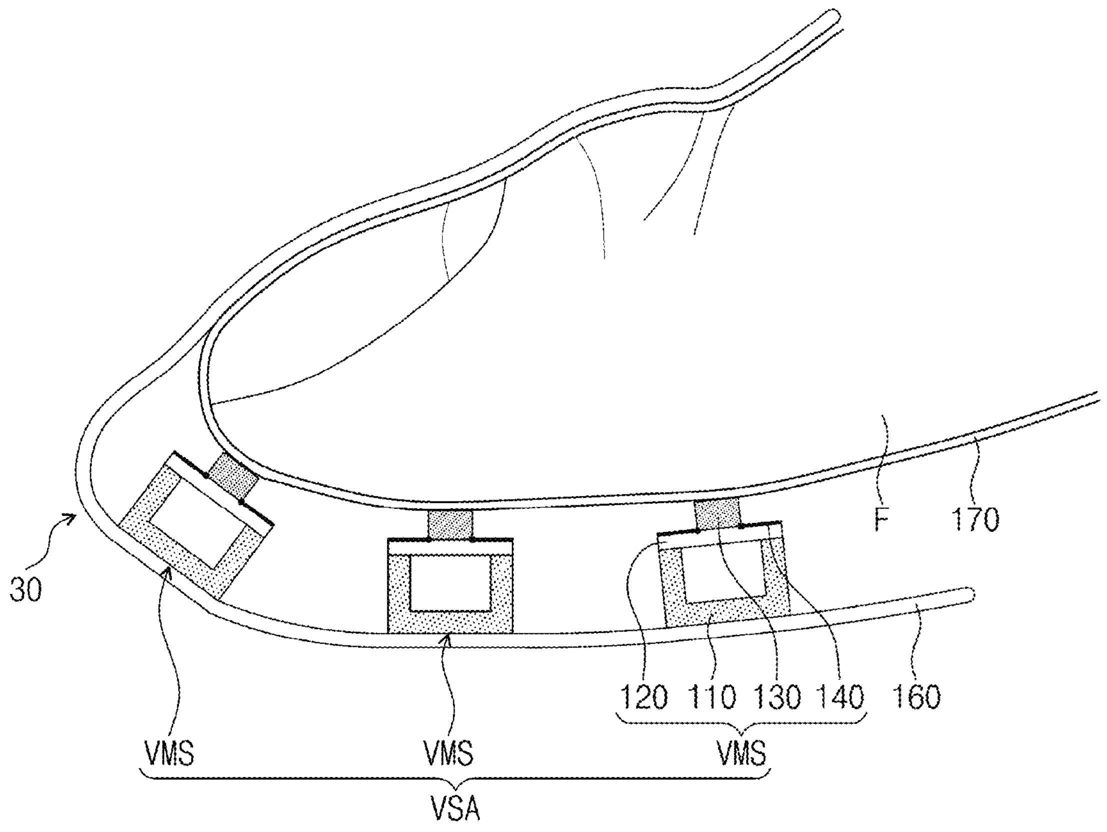

FIG. 31 is a conceptual diagram illustrating the use of a vibratory stimulation device according to embodiments of the inventive concept.

Referring to FIG. 31, the vibratory stimulation device 30 according to the inventive concept may be coupled to a person's finger F or a hand or foot through the first substrate 100 and the protective film 170. For example, the vibratory stimulation device 30 may have a thimble, band, or glove shape, and may deliver vibration stimulation to the finger F, a hand, or a foot. For example, the vibratory stimulation device 10 may include a protective film 170 as described with reference to FIG. 17.

The vibratory stimulation device 30, which transmits vibration stimulation to the finger F, may transmit vibrational tactile information by dividing it by position of the vibration elements VMS, and, for example, may transmit VR or AR tactile information.

The vibratory stimulation device according to the inventive concept may individually drive and/or control vibration stimulation by configuring a plurality of vibration elements as an array, and accordingly, provide vibration stimulation with various vibration patterns to the hair, scalp and skin to increase the effect of stimulation (e.g., absorption of nutrients, improvement of blood and body fluid circulation, wrinkle improvement, whitening, elasticity improvement, hair loss prevention, etc.), and improve user convenience.

In addition, the vibratory stimulation device according to the inventive concept may be implanted inside the body to deliver vibration stimulation to tissues such as brain, blood vessels, nerves, and organs.

Furthermore, the vibratory stimulation device according to the inventive concept may be used as a product (e.g., a VR/AR tactile glove, a tactile display, a wearable vibration display device, etc.) that divides and transmits vibrational tactile information by each location of a vibration element.

Although the embodiments of the inventive concept have been described, it is understood that the inventive concept should not be limited to these embodiments but various changes and modifications may be made by one ordinary skilled in the art within the spirit and scope of the inventive concept as hereinafter claimed.

What is claimed is:

1. A vibratory stimulation device comprising:

a first substrate;

a connection band connected to both sides of the first substrate; and a vibration element array including a plurality of vibration elements provided on the first substrate, wherein each of the vibration elements comprises:

a stand provided on the first substrate;

a vibration film provided on the stand and in contact with the stand at an edge;

a vibrator provided on an upper or lower surface of the vibration film; and an electrode wire connected to the vibrator, wherein the vibration film includes a material that is more flexible and stretchable than the stand.

2. The vibratory stimulation device of claim 1, wherein the vibration film comprises PDMS, PMMA, elastomer, silicone, urethane, rubber, polyacrylic, elastic fiber, tape, or sponge.

3. The vibratory stimulation device of claim 1, wherein the stand comprises plastic, curable resin, metal, ceramic, or oxide.

4. The vibratory stimulation device of claim 1, wherein the stand has a cylindrical or polygonal column shape in which at least one of upper part and lower part is open.

5. The vibratory stimulation device of claim 1, wherein the stand or the vibration film comprises air holes through which air freely enters and exits.

6. The vibratory stimulation device of claim 1, wherein the vibrator is an eccentric rotating mass (ERM), a linear resonator actuator (LRA), or a piezoelectric actuator configured to generate vibration according to an applied electric signal.

7. The vibratory stimulation device of claim 1, wherein at least a portion of the connection band comprises Velcro or a patch having adhesive force, wherein the connection band has a clothing shape that is fixed or adhered to a body part.

8. The vibratory stimulation device of claim 1, wherein each of the vibration elements further comprises a protruding structure provided on an upper surface of the vibrator or an upper surface of the vibration film.

9. The vibratory stimulation device of claim 1, wherein each of the vibration elements further comprises a vibrator pocket surrounding the vibrator and adhered to an upper or lower surface of the vibration film.

10. The vibratory stimulation device of claim 1, further comprising a second substrate provided between the first substrate and the vibration element array, wherein the second substrate comprises a material that is more flexible and stretchable than the first substrate.

11. The vibratory stimulation device of claim 1, further comprising a protective film provided on the vibration element array, wherein the protective film is in contact with an upper surface of the vibrator of each of the vibration elements, wherein the protective film comprises a material that is more flexible and stretchable than the first substrate.

12. The vibratory stimulation device of claim 11, further comprising contact pads provided on the protective film, wherein the contact pads comprise a material that is more flexible and stretchable than the first substrate.

13. The vibratory stimulation device of claim 11, further comprising ciliated pads in a shape of a fine brush or hair provided on the protective film, wherein one end of each of the ciliated pads is fixed to an upper surface of the protective film, wherein the other end of each of the ciliated pads is configured to be freely shaken or bent.

14. The vibratory stimulation device of claim 11, further comprising a protruding contact pad provided on the protective film, wherein the protruding contact pad comprises a flat pad portion and protruding portions protruding from the flat pad portion.

15. The vibratory stimulation device of claim 1, wherein the vibration elements of the vibration element array are arranged along a first direction and a second direction crossing the first direction on the first substrate.

16. A vibratory stimulation system comprising:

a vibratory stimulation device including a first substrate, a connection band connected to both sides of the first substrate, and a vibration element array including a plurality of vibration elements provided on the first substrate;

a control unit that is individually connected to the vibration elements; and a power supply unit connected to the control unit and configured to supply electrical energy to the vibratory stimulation device and the control unit, wherein each of the vibration elements comprises:

a stand provided on the first substrate;

a vibration film provided on the stand and in contact with the stand at an edge;

a vibrator provided on an upper or lower surface of the vibration film; and an electrode wire connecting the vibrator and the control unit, wherein the vibration film comprises a material that is more flexible and stretchable than the stand.

17. The vibratory stimulation system of claim 16, further comprising a second substrate provided between the first substrate and the vibration element array, wherein the second substrate comprises a material that is more flexible and stretchable than the first substrate.

18. The vibratory stimulation system of claim 16, wherein the control unit induces vibration stimulation of each of the vibration elements simultaneously, sequentially or in a pre-programmed pattern.

19. The vibratory stimulation system of claim 16, wherein the vibratory stimulation device is provided in plurality, wherein the first substrates of the vibratory stimulation devices are connected to each other.

20. The vibratory stimulation system of claim 16, wherein the vibration film comprises PDMS, PMMA, elastomer, silicone, urethane, rubber, polyacrylic, elastic fiber, tape or sponge, wherein the stand comprises plastic, curable resin, metal, ceramic, or oxide.

* * * * *